(12) United States Patent
Jain

(10) Patent No.: US 9,940,187 B2
(45) Date of Patent: Apr. 10, 2018

(54) NEXUS DETERMINATION IN A COMPUTING DEVICE

(71) Applicant: Microsoft Technology Licensing, LLC, Redmond, WA (US)

(72) Inventor: Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 14/690,361

(22) Filed: Apr. 17, 2015

(65) Prior Publication Data

US 2016/0306689 A1    Oct. 20, 2016

(51) Int. Cl.
*G06F 11/07* (2006.01)

(52) U.S. Cl.
CPC ........ *G06F 11/079* (2013.01); *G06F 11/0742* (2013.01); *G06F 11/0751* (2013.01)

(58) Field of Classification Search
CPC .. G06F 11/008; G06F 11/0742; G06F 11/079; G06F 11/3466; G06F 11/3495; G06F 11/0778
USPC ...................................... 714/38.11
See application file for complete search history.

(56) References Cited

U.S. PATENT DOCUMENTS

| | | | |
|---|---|---|---|
| 7,191,364 B2 | 3/2007 | Hudson et al. | |
| 7,437,762 B2* | 10/2008 | Dacier | G06F 11/0709 709/224 |
| 7,489,639 B2 | 2/2009 | Breitgand et al. | |
| 7,500,142 B1 | 3/2009 | Cowart et al. | |
| 7,502,971 B2* | 3/2009 | Cohen | G06F 11/008 702/186 |
| 8,131,756 B2 | 3/2012 | Carus et al. | |
| 8,271,952 B2 | 9/2012 | Jain et al. | |
| 8,365,019 B2 | 1/2013 | Sailer et al. | |

(Continued)

FOREIGN PATENT DOCUMENTS

| | | |
|---|---|---|
| EP | 2778924 | 9/2014 |
| WO | WO2014149080 | 9/2014 |

OTHER PUBLICATIONS

Dang et al., "ReBucket: A Method for Clustering Duplicate Crash Reports Based on Call Stack Similarity", in the Proceedings of the 34th International Conference on Software Engineering, Jun. 2012, 10 pages.
Dommanti et al., "Bug Classification: Feature Extraction and Comparison of Event Model using Naive Bayes Approach", in the Proceedings of the International Conference on Recent Trends in Computer and Information Engineering, Apr. 2012, 5 pages.

(Continued)

*Primary Examiner* — Joseph R Kudirka

(57) ABSTRACT

A nexus of a software failure can be determined. A feature module can determine execution features based at least in part on particular execution-related data. An analysis module can determine particular nexus data based at least in part upon a stored computational model and the determined execution features. In some examples, a communications module receives the particular execution-related data and transmits the determined particular nexus data via the communications interface. In some examples, a modeling module determines the computational model based at least in part on training data including execution features of a plurality of execution-related data records and respective nexus data values. Some examples include executing a program module, transmitting execution-related data of the program module, receiving a nexus data value, and executing the program module again if the nexus is a condition external to the program module.

20 Claims, 9 Drawing Sheets

(56) References Cited

U.S. PATENT DOCUMENTS

| | | | |
|---|---|---|---|
| 8,473,251 B1 | 6/2013 | Noth et al. | |
| 8,479,051 B2 | 7/2013 | Yuan et al. | |
| 8,516,308 B1 | 8/2013 | Gill et al. | |
| 8,538,897 B2* | 9/2013 | Han | G06F 11/079 706/12 |
| 8,694,831 B2 | 4/2014 | Arapov et al. | |
| 8,726,092 B1 | 5/2014 | Gray et al. | |
| 2004/0250170 A1 | 12/2004 | Glerum et al. | |
| 2006/0026467 A1 | 2/2006 | Nehab et al. | |
| 2008/0185432 A1 | 8/2008 | Caballero et al. | |
| 2008/0250265 A1 | 10/2008 | Chang et al. | |
| 2009/0006883 A1 | 1/2009 | Zhang et al. | |
| 2012/0260141 A1 | 10/2012 | Bhagwan et al. | |
| 2013/0179863 A1 | 7/2013 | Vangala et al. | |
| 2013/0198565 A1* | 8/2013 | Mancoridis | G06F 11/008 714/26 |
| 2013/0346594 A1* | 12/2013 | Banerjee | G06F 11/3495 709/224 |
| 2014/0026002 A1 | 1/2014 | Haines | |
| 2015/0324254 A1* | 11/2015 | Prasad | G06F 11/1402 707/642 |
| 2016/0055043 A1* | 2/2016 | Chikabelapur | G06F 11/079 714/37 |
| 2016/0078347 A1* | 3/2016 | Salajegheh | G06N 5/04 706/12 |

OTHER PUBLICATIONS

Liu et al., "R2Fix: Automatically Generating Bug Fixes from Bug Reports", in the Proceedings of the 2013 IEEE Sixth International Conference on Software Testing, Verification and Validation, Mar. 2013, 10 pages.

Ravindranath et al., "AppInsight: Mobile App Performance Monitoring in the Wild", in the Proceedings of the 10th USENIX Conference on Operating Systems Design and Implementation, Oct. 2012, 14 pages.

Ravindranath, "Automatic and Scalable Fault Detection for Mobile Applications", in the Proceedings of the 12th Annual International Conference on Mobile Systems, Applications, and Services, Jun. 2014, 14 pages.

"Real-time Processing", retrieved on Dec. 11, 2014 at <<http://try.crashlytics.com/realtime/>>, 3 pages.

Seo et al., "Predicting Recurring Crash Stacks", in the Proceedings of the 27th IEEE/ACM International Conference Automated on Software Engineering, Sep. 2012, 10 pages.

PCT Search Report and Written Opinion dated Jun. 27, 2016 for PCT Application No. PCT/US2016/026298.

PCT Written Opinion of the International Preliminary Examining Authority for PCT application No. PCT/US2016/026298, 8 pages. dated Apr. 6, 2017.

"International Preliminary Report on Patentability Issued in PCT Application No. PCT/US2016/026298", dated Jul. 7, 2017, 8 Pages.

* cited by examiner

NEXUS DETERMINATION IN A COMPUTING DEVICE

BACKGROUND

Smartphones and other networked computing devices can run a wide variety of software programs. Failures in these software programs often lead to user dissatisfaction or failure to meet required performance criteria. For example, users often provide negative reviews of smartphone apps that fail during use. Failures during use can include failure to perform as expected, or unexpected termination of the app (e.g., triggering a "crash report" message on IOS devices or a "stopped" message on ANDROID devices). Within a software program, failures can, e.g., cause an exception to be thrown or cause a function to return a value indicative of an error (e.g., −1 for many POSIX system calls).

Many computing devices, such as smartphones, are subject to operational variations beyond the control of software programs. For example, network connectivity, accelerometer readings, and central processing unit (CPU) clock speed can change at any time because of battery life or the device's position or orientation in the real world.

SUMMARY

This disclosure describes systems, methods, and computer-readable media for determining possible nexuses of software events such as failures or state inconsistencies. In some examples, a computing system determines one or more execution features based at least in part on received particular execution-related data. The computing system determines particular nexus data corresponding to the particular execution-related data based at least in part upon a stored computational model and the determined execution features. Example techniques described herein can receive the particular execution-related data via a communications interface, e.g., from a smartphone, and transmit at least some of the determined particular nexus data via the communications interface, e.g., to the device from which the execution-related data was received. Example techniques described herein can use a machine-learning model as the computational model. Example techniques described herein can determine the computational model based at least in part on execution features of a plurality of execution-related data records and respective nexus data values. In some example techniques described herein, an untethered computing device can execute a program module and transmit execution-related data corresponding at least in part to the program module via a communications interface. The device can receive a nexus data value via the communications interface. In response to the nexus data value indicating a condition external to the program module, the device can repeat the execution of the program module, e.g., again carry out program instructions in the program module. In some examples, the device can perform the transmitting and receiving in an exception handler.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to systems, methods, computer-readable instructions, modules, algorithms, hardware logic, and/or operations as permitted by the context described above and throughout the document.

BRIEF DESCRIPTION OF THE DRAWINGS

The detailed description is described with reference to the accompanying figures. In the figures, the left-most digits of a reference number identifies the figure in which the reference number first appears. The same reference numbers in different figures indicate similar or identical items.

DETAILED DESCRIPTION

Overview

Figure 1:
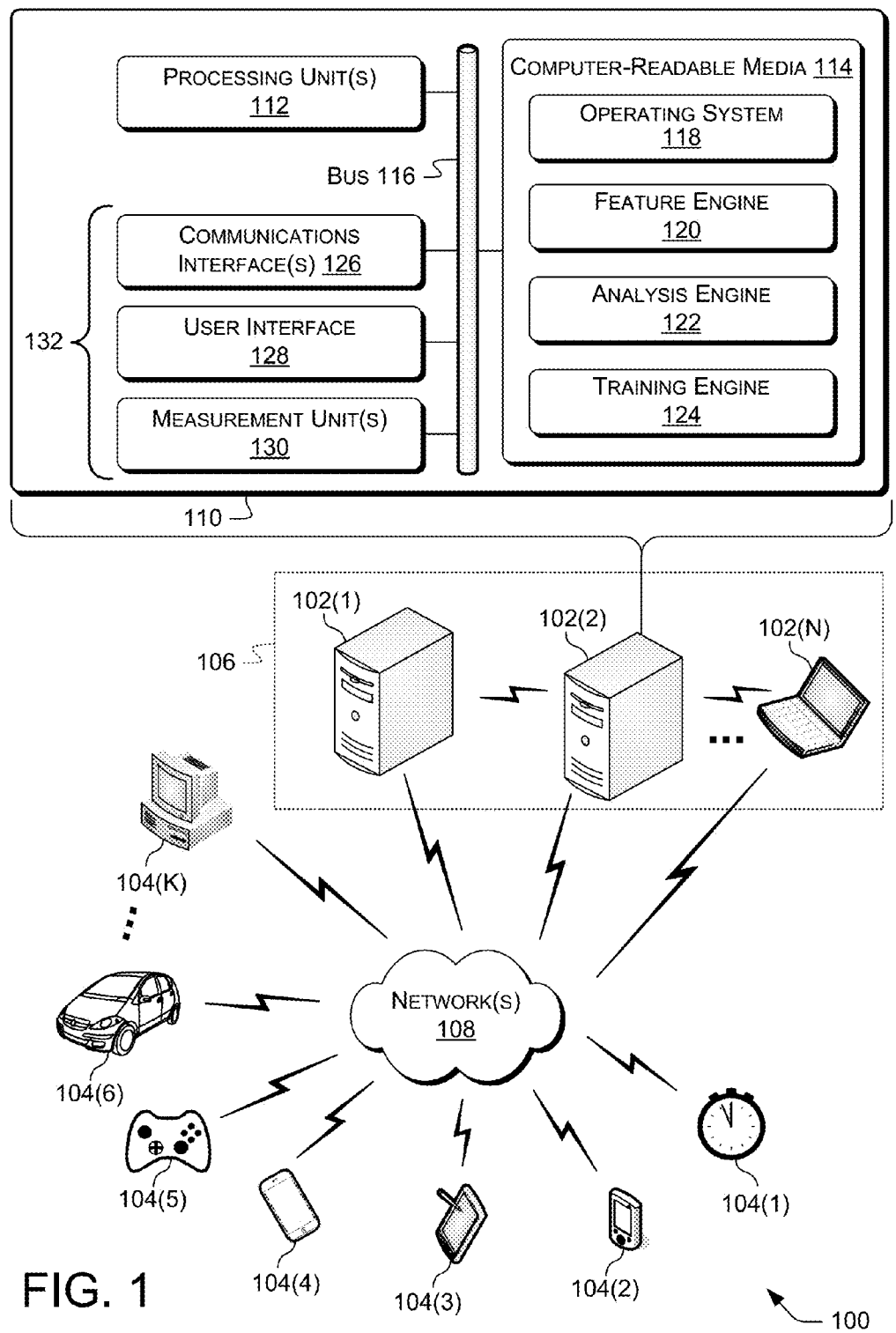
FIG. 1 is a block diagram depicting an example environment for implementing nexus determination as described herein.

Examples described herein provide techniques and constructs to improve the analysis of software failures by determining possible nexuses for software failures or inconsistencies. This determination can permit developers to more rapidly correct software programming errors (bugs) and can permit users to understand whether undesirable program behavior is the result of a bug or another feature.

Some examples described herein provide more pertinent information to app developers than do conventional crash reports. By providing nexus data, example techniques described herein can permit the app developer to more quickly locate and fix bugs that lead to crashes. For example, the .NET NotSupportedException can be thrown by many different methods for many different reasons. Various examples of nexus determination herein can determine that a NotSupportedException was caused by, e.g., user text input that did meet the expected form constraints, as opposed to a NotSupportedException that was caused by, e.g., attempting to write to a read-only stream.

Various examples herein relate to "untethered devices." As used herein, the term "untethered device" refers to a computing device that, during its normal use, lacks at least one of (1) a wired power connection to AC mains and (2) a wired connection to a communications network. Examples of untethered devices include portable computing devices such as smartphones or tables and Internet of Things (IoT) devices such as sensor motes and smart appliances. Operational variations due to the position, battery life, or other physical attributes of an untethered device can affect the behavior of software running on that untethered device in ways not expected by, or beyond the control of, that software.

As used herein, the terms "app" and "software program" refer generally to any software or portion thereof running on a computing device and configured to participate in nexus determination as described herein. Examples of apps can include conventional smartphone downloadable programs, conventional desktop-computer programs such as word processors and spreadsheets, smartphone and other embedded operating systems, programs included with such operating systems, and embedded programs (e.g., firmware or software) running on sensor devices such as IoT devices. As used herein, the terms "app" and "software program" also encompass hardwired logic included in a computing device and configured to participate in nexus determination as described herein.

As used herein, a "bug" is an undesirable app behavior deriving from or triggered by an underlying error in the code of the app. Bugs can include crashes and other unrecoverable errors. Bugs can additionally or alternatively include detectable inconsistencies in the internal state of an app.

Determining a "nexus" of a bug, i.e., determining "nexus data" or a "nexus indication" as described herein, does not necessarily require determining the exact lines or bytes of code that include errors. As used herein, a "nexus" is a set of circumstances or state, or an underlying issue or cause, that triggered a bug or caused the bug to manifest itself. That is, had the determined nexus not been present, the bug likely would not have occurred. "Nexus data" and "nexus indications" can include description(s), meaningful to programmers, of a nexus. Such description(s) can include, e.g., error codes, line numbers, text strings, or codes representing, e.g., categories of nexuses or specific nexuses. A bug can have more than one nexus, in which case "determining a nexus" as described herein can include determining one or more of the nexuses. Example nexuses include those listed in Table 1, although others are possible. In some examples, nexus data includes an integer code corresponding to one of the rows in the table, e.g., 1 for "memory depletion" through 10 for "low/insufficient battery," as shown in the "Example Nexus Data" column in Table 1.

TABLE 1

| Example Nexus Data | Example Nexus | Description |
| --- | --- | --- |
| 1 | Memory depletion or "memory pressure" | The device has too little free memory (e.g., random-access memory, RAM) |
| 2 | Secondary-storage depletion or "disk full" | The device has too little free secondary storage (e.g., Flash-drive space) |
| 3 | Input overrun or "impatient user" | The user of the app has provided input events faster than the app can process them, or has provided contradictory input events such as input events requesting mutually-exclusive app functions. |
| 4 | Network connectivity failure | A connection to a server is unavailable or interrupted, e.g., because of a loss of overall network connectivity at the device. Loss of connectivity can be due to, e.g., low Radio Signal Strength (RSS), handoff failures or interruptions between base stations, or intermittent connectivity. |
| 5 | Server response error | A server or other computer connected to the device via a network has returned an error message in response to a request. Examples include Hypertext Transfer Protocol (HTTP) 404 Not Found errors, although others errors in HTTP or other protocols or server procedures are possible. |
| 6 | Invalid data input or "parsing error" | A user or another computer has provided data that does not fit the form the app expects (e.g., letters in a numeric field). |
| 7 | Invalid sensor reading | A sensor has returned a null, meaningless, or out-of-range measurement for a physical property. Examples include orientation values from a gimbal-locked orientation sensor. |
| 8 | Device overheating | The device or a portion thereof (e.g., a sensor or a graphics processing unit, GPU) has become overheated and its operating system has either terminated, throttled resources (e.g., power off network) or slowed down the execution of some of the running applications/processes. |
| 9 | Low/Insufficient battery | The battery powering the device is either fully drained or close to draining. This can cause apps to be suddenly terminated while in an inconsistent state, or can cause apps or the system to enter an inconsistent state. |

In some examples, memory depletion, secondary-storage depletion, and low/insufficient battery can be examples of insufficient-resource conditions. Input overrun, server response error, invalid sensor reading, and parsing error can be examples of invalid-input conditions. Network connectivity failure and device overheating can be examples of physical-limitation conditions. Various example physical-limitation conditions can be device-centric (e.g., overheating) or related to the external environment (e.g., network connectivity).

Data indicating a nexus can be stored or transmitted as any combination of a human-readable text string, a pre-defined numeric or string constant, a bitmask having bit positions in a predefined relationship with possible nexuses, and one or more constants or bitmasks indicating the source or severity of the nexus. In some examples, nexus data of a bug can include a human-readable string describing the nexus (e.g., "memory pressure") together with one or more bits indicating whether the nexus is external to the untethered computing device experiencing the bug. These bits can permit the untethered device to respond appropriately, e.g., as discussed below with reference to decision block 1008, FIG. 10.

Some examples, scenarios, and examples of techniques for nexus determination in accordance with some examples are presented in greater detail in the following description of the figures.

Illustrative Environment

FIG. 1 shows an example environment 100 in which examples of nexus-determination systems can operate or in which nexus-determination methods such as described below can be performed. In the illustrated example, various devices and/or components of environment 100 include computing devices 102(1)-102(N) (individually or collectively referred to herein with reference 102), where N is any integer greater than or equal to 1, and computing devices 104(1)-104(K) (individually or collectively referred to herein with reference 104), where K is any integer greater than or equal to 1. In some examples, N=K; in other examples, N>K or N<K. Although illustrated as, e.g., desktop computers, laptop computers, tablet computers, or cellular phones, computing devices 102 or 104 can include a diverse variety of device categories, classes, or types and are not limited to a particular type of device.

In the illustrated example, computing devices 102(1)-102(N) can be computing nodes in a cluster 106, e.g., a cloud service such as MICROSOFT AZURE. Cloud computing permits computing resources to be provided as services rather than a deliverable product. For example, in a cloud-computing environment, computing power, software, information, and/or network connectivity are provided (for example, through a rental agreement) over a network, such as the Internet. In the illustrated example, computing devices 104 can be clients of cluster 106 and can submit jobs to cluster 106 and/or receive job results from cluster 106. Computing devices 102(1)-102(N) in cluster 106 can, e.g., share resources, balance load, increase performance, or provide fail-over support or redundancy. In some examples, some of the computing devices 102 can be hosted by a cloud service and others hosted at a customer's site. Computing devices 104 can additionally or alternatively operate in a cluster or grouped configuration.

By way of example and not limitation, computing devices 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 102(N)), wearable computers such as smart watches or biometric or medical sensors, implanted computing devices such as biometric or medical sensors, fixed sensors, such as IoT sensors, configured to monitor time, environmental conditions, vibration, motion, or other attributes of the world or structures or devices therein, e.g., bridges or dams (e.g., 104(1), represented graphically as a clock), computer navigation client computing devices, satellite-based navigation system devices including global positioning system (GPS) devices and other satellite-based navigation system devices (e.g., 104(2), represented graphically as a PDA), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles (e.g., 104(6), represented graphically as an automobile), personal data assistants (PDAs), desktop computers (e.g., 104(K)), or integrated components for inclusion in computing devices, appliances, or other computing devices configured to participate in or carry out nexus determination as described herein, e.g., for software debugging or monitoring purposes. In some examples, as indicated, computing devices, e.g., computing devices 102(1) and 102(2), can intercommunicate to participate in or carry out nexus determination as described herein.

Different devices or types of devices can have different uses for nexus data. For example, devices generally used by people such as computing devices 104(2)-104(4) can present nexus data to their users to assist the users in determining the appropriate response to a bug. Devices that generally operate autonomously, such as computing devices 104(1), can use nexus data to request appropriate maintenance.

In some examples, computing devices 102 or 104 can communicate with each other or with other computing devices via one or more networks 108. In some examples, computing devices 102 or 104 can communicate with external devices via networks 108. For example, networks 108 can include public networks such as the Internet, private networks such as an institutional or personal intranet, cellular networks, or combinations of private and public networks. Networks 108 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Networks 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, networks 108 can also include a number of devices that facilitate network communications or form a hardware infrastructure for the networks, such as switches, routers, gateways, access points, firewalls, base stations, repeaters, backbone devices, and the like. Networks 108 can also include devices that facilitate communications between computing devices 102 or 104 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. Signals representing characteristics of particular networks accessible to or within range of a computing device 102 or 104 can be used in determining nexuses. The type of network 108 used for any given connection between, e.g., a computing device 104 and cluster 106 can be selected based on these characteristics and on the type of interaction. For example, a low-power, low-bandwidth network can be selected for IoT sensors, and a low-latency network can be selected for smartphones.

In some examples, networks 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Still referring to the example of FIG. 1, details of an example computing device 102(2) are illustrated at inset 110. The details of example computing device 102(2) can be representative of others of computing devices 102 or 104. However, individual ones of the computing devices 102 or 104 can include additional or alternative hardware and/or software components. Computing device 102(2) can include one or more processing units 112 operably connected to one or more computer-readable media 114 such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 112 can exchange data through an internal interface bus (e.g., PCIe), rather than or in addition to network 108. While in this example the processing units 112 are described as residing on the computing device 102(2), the processing units 112 can also reside on different computing devices 102 or 104 in some examples. In some examples, at least two of the processing units 112 can reside on different computing devices 102 or 104. In such examples, multiple processing units 112 on the same computing device 102 or 104 can use an interface bus 116 of the computing device 102 or 104 to exchange data, while processing units 112 on different computing devices 102 or 104 can exchange data via networks 108.

Processing units 112 can be or include one or more single-core processors, multi-core processors, CPUs, GPUs, general-purpose graphics processing units (GPGPUs), or hardware logic components configured, e.g., via specialized programming from modules or APIs, to perform functions described herein. For example, and without limitation, illustrative types of hardware logic components that can be used in or as processing units 112 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 112 can represent a hybrid device, such as a device from ALTERA or XILINX that includes a CPU core embedded in an FPGA fabric. These or other hardware logic components can operate independently or, in some instances, can be driven by a CPU. In some examples, at least some of computing devices 102 or 104 can include a plurality of processing units 112 of multiple types. For example, the processing units 112 in computing device 102(2) can be a combination of one or more GPGPUs and one or more FPGAs. Different processing units 112 can have different execution models, e.g., as is the case for graphics processing units (GPUs) and central processing unit (CPUs). In some examples, processing units 112, computer-readable media 114, and modules or engines stored on computer-readable media 114 can together represent an ASIC, FPGA, or other logic device configured to carry out the functions of such modules or engines.

Computer-readable media described herein, e.g., computer-readable media 114, includes computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 114 can store instructions executable by the processing units 112 that, as discussed above, can represent a processing unit incorporated in computing device 102. Computer-readable media 114 can additionally or alternatively store instructions executable by external processing units such as by an external CPU or external processor of any type discussed above. In some examples at least one processing unit 112, e.g., a CPU, GPU, or hardware logic device, is incorporated in computing device 102, while in some examples at least one processing unit 112, e.g., one or more of a CPU, GPU, or hardware logic device, is external to computing device 102.

Computer-readable media 114 can store, for example, executable instructions of an operating system 118, a feature engine 120, an analysis engine 122, a training engine 124, and other modules, programs, or applications that are loadable and executable by processing units 112. In some examples not shown, one or more of the processing units 112 in one of the computing devices 102 or 104 can be operably connected to computer-readable media 114 in a different one of the computing devices 102 or 104, e.g., via communications interface 126 and network 108. For example, program code to perform steps of flow diagrams herein can be downloaded from a server, e.g., computing device 102(1), to a client, e.g., computing device 104(K), e.g., via the network 108, and executed by one or more processing units 112 in computing device 104(K). For example, the computer-executable instructions stored on the computer-readable media 114 can upon execution configure a computer such as a computing device 102 or 104 to perform operations described herein with reference to the operating system 118, the feature engine 120, the analysis engine 122, or the training engine 124.

Computer-readable media 114 of the computing device 102 can store an operating system 118. In some examples, operating system 118 is not used (commonly referred to as a "bare metal" configuration). In some examples, operating system 118 can include components that enable or direct the computing device 102 to receive data via various inputs (e.g., user controls, network or communications interfaces, memory devices, or sensors), and process the data using the processing units 112 to generate output. The operating system 118 can further include one or more components that present the output (e.g., display an image on an electronic display, store data in memory, transmit data to another computing device, etc.). The operating system 118 can enable a user to interact with apps or with modules of the analysis engine 122 using a user interface 128. Additionally, the operating system 118 can include components that perform various functions generally associated with an operating system, e.g., storage management and internal-device management.

Computing device 102 can also include one or more communications interfaces 126 to enable wired or wireless communications between computing devices 102 or 104 and other networked computing devices 102 or 104 involved in nexus determination or running apps, or other computing devices, over networks 108. Such communications interfaces 126 can include one or more transceiver devices, e.g., network interface controllers (NICs) such as Ethernet NICs or other types of transceiver devices, to send and receive communications over a network. The processing units 112 can exchange data through respective communications interfaces 126. In some examples, the communications interface 126 can be a PCIe transceiver, and the network 108 can be a PCIe bus. In some examples, the communications interface 126 can include, but is not limited to, a transceiver for cellular (3G, 4G, or other), WI-FI, Ultra-wideband (UWB), BLUETOOTH, or satellite transmissions. The communications interface 126 can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102.

In some examples, computing device 102 or 104 can include user interface 128. User interface 128 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like.

User interface 128 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

In some examples, computing device 102 or 104 can include one or more measurement units 130. Measurement units 130 can detect physical properties or status of computing device 102 or its environment. Examples of measurement units 130 can include units to detect motion, temperature, pressure, light, sound, electromagnetic radiation (e.g., for wireless networking), or any other detectable form of energy or matter in or within sensing range of computing device 102 or 104.

In some examples, e.g., of a smartphone computing device 104(4), measurement units 130 can include an accelerometer, a microphone, or front- and rear-facing cameras. Examples of measurement units 130 can include devices for measuring physical properties, devices for communicating, or devices for receiving information. In some examples, measurement units 130 can include a network transceiver (e.g., communications interface 126), a motion sensor, a proximity detector (e.g., for nearby life forms, people, or devices), a light sensor (e.g., a CdS photoresistor or a phototransistor), a still imager (e.g., a charge-coupled device, CCD, or complementary metal-oxide-semiconductor, CMOS, sensor), a video imager (e.g., CCD or CMOS), a microphone, a fingerprint reader, a retinal scanner, an iris scanner, or a touchscreen (e.g., in or associated with a display in user interface 128 such as display 212, FIG. 2).

In some examples, computing device 102 or 104 can include one or more sensors 132. Components of communications interface 126, e.g., transceivers for BLUETOOTH, WI-FI, or LTE, can be examples of sensors 132. Such components can be used to, e.g., detect signals corresponding to characteristics of accessible networks. Such signals can also be detected by automatically locating information in a table of network information (e.g., cell-phone tower locations), or by a combination of detection by component of communications interface 126 and table lookup. Components of user interface 128, e.g., touchscreens or phone mouthpieces, can also be examples of sensors 132. Measurement units 130 can also be examples of sensors 132. In some examples, a particular device can simultaneously or selectively operate as part of two or more of communications interface 126, user interface 128, and one or more measurement units 130. For example, a touchscreen can be an element of user interface 128 and used to present information and receive user commands. Signals from the same touchscreen can also be used in determining a user's grip on computing device 102 or 104. Accordingly, that touchscreen in this example is also a sensor 132.

Illustrative Components

Figure 2:
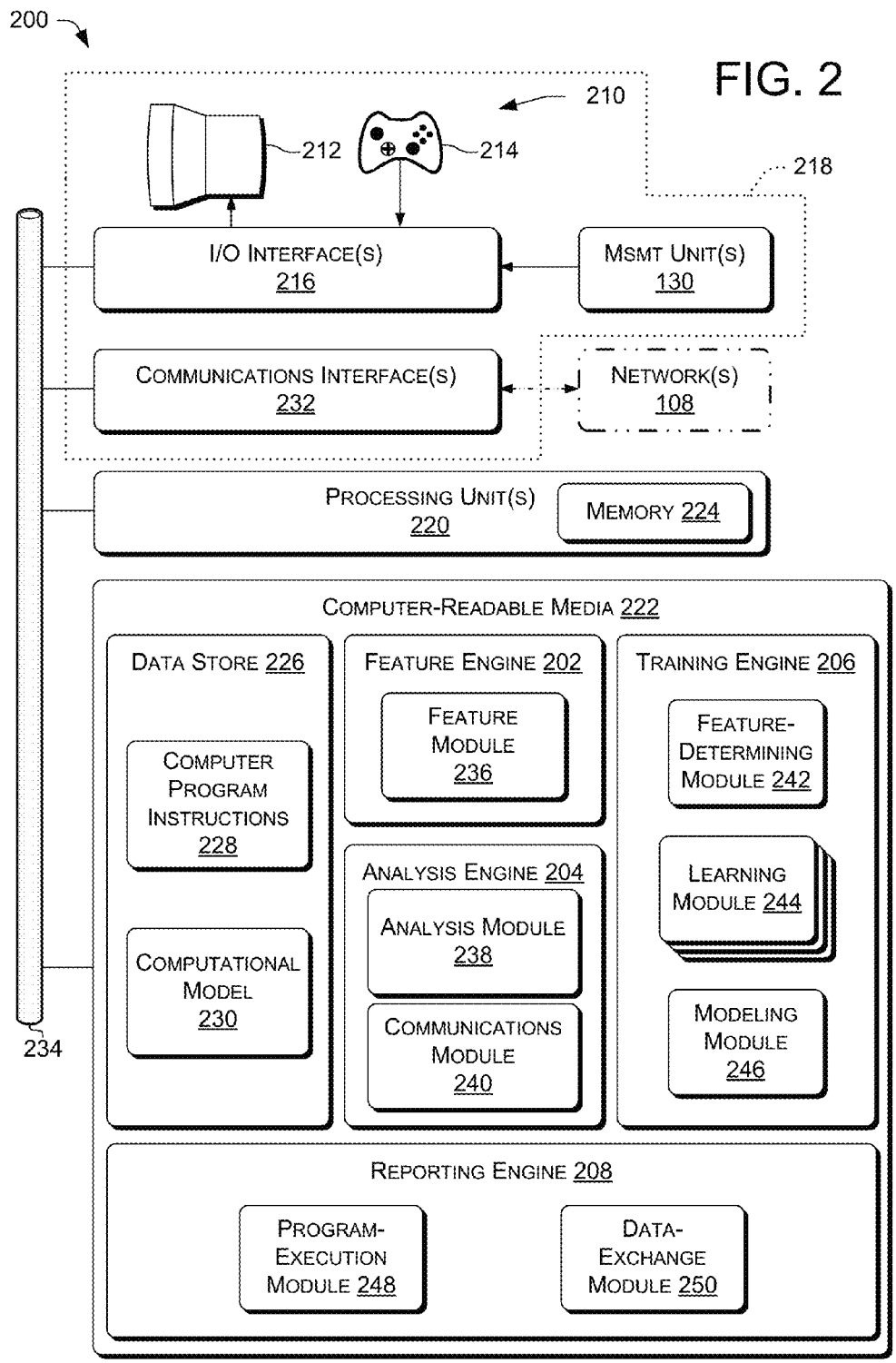
FIG. 2 is a block diagram depicting an example computing device configured to participate in nexus determination according to various examples described herein.

FIG. 2 is an illustrative diagram that shows example components of a computing device 200, which can represent computing devices 102 or 104, and which can be configured to participate in nexus determination, according to various examples described herein. Computing device 200 can implement a feature engine 202, which can represent feature engine 120, FIG. 1. Computing device 200 can implement an analysis engine 204, which can represent analysis engine 122, FIG. 1. Computing device 200 can implement a training engine 206, which can represent training engine 124, FIG. 1. Computing device 200 can implement a reporting engine 208.

In some examples, e.g., of a computing device 102 providing a nexus determination service, the computing device 200 can implement feature engine 202 and analysis engine 204 but not reporting engine 208. In some examples, e.g., of an untethered computing device 104 making use of a nexus determination service, the computing device 200 can implement reporting engine 208 but not analysis engine 204. In some examples, e.g., of a computing device 102 or 104 implementing both a nexus determination service and the use thereof, the computing device 200 can implement feature engine 202, analysis engine 204, and reporting engine 208.

Computing device 200 can include or be connected to a user interface 210, which can represent user interface 128. User interface 210 can include a display 212. Display 212 can include an organic light-emitting-diode (OLED) display, a liquid-crystal display (LCD), a cathode-ray tube (CRT), or another type of visual display. Display 212 can be a component of a touchscreen, or can include a touchscreen. User interface 210 can include various types of output devices described above with reference to user interface 128. In some examples, the reporting engine 208 is operatively coupled to the display 212 or another output device.

User interface 210 can include a user-operable input device 214 (graphically represented as a gamepad). User-operable input device 214 can include various types of input devices described above with reference to user interface 128.

Computing device 200 can further include one or more input/output (I/O) interfaces 216 by which computing device 200 can communicate with input, output, or I/O devices (for clarity, some not depicted). Examples of such devices can include components of user interface 210 such as user-operable input devices and output devices described above with reference to user interface 128. Other examples of such devices can include power meters, temperature sensors, and other devices for measuring properties of computing device 200 or its environment or of another computing device 102 or 104 or an environment thereof. Computing device 200 can communicate via I/O interface 216 with suitable devices or using suitable electronic/software interaction methods. Input data, e.g., of user inputs on user-operable input device 214, can be received via I/O interfaces 216, and output data, e.g., of user interface screens, can be provided via I/O interfaces 216 to display 212, e.g., for viewing by a user.

The computing device 200 can include one or more sensors 218, which can represent measurement units 130 or other sensors 132, as described above with reference to FIG. 1. Sensors 218 can also include components of user interface 210. In some examples, the user interface 210 can include at least one of the sensors 218. For example, the user interface 210 can include a touchscreen that includes a sensor 218. Individual ones of the sensors 218 can be configured to output sensor data corresponding to at least one physical property, e.g., a physical property of the device, such as acceleration, or of an environment of the device, such as temperature or humidity.

The computing device 200 can include one or more processing units 220, which can represent processing units 112. Processing units 220 can be operably coupled, e.g., via the I/O interface 216, to the user interface 210 and/or the sensors 218. Processing units 220 can be operably coupled to at least one computer-readable media 222, discussed below. Processing units 220 can include, e.g., processing unit types described above such as CPU- or GPGPU-type processing units. In some examples, processing units 220 can include or be connected to a memory 224, e.g., a random-access memory (RAM) or cache.

The processing units 220 can be configured to execute modules of the plurality of modules. For example, the computer-executable instructions stored on the computer-readable media 222 can upon execution configure a computer such as a computing device 200 to perform operations described herein with reference to the modules of the plurality of modules, e.g., modules of the feature engine 202, analysis engine 204, training engine 206, or reporting engine 208. The modules stored in the computer-readable media 222 can include instructions that, when executed by the one or more processing units 220, cause the one or more processing units 220 to perform operations described below. Examples of modules in computer-readable media 222 are discussed below. Computer-readable media 222 can also include an operating system, e.g., operating system 118.

In the illustrated example, computer-readable media 222 includes a data store 226. In some examples, data store 226 can include data storage, structured or unstructured, such as a database (e.g., a Structured Query Language, SQL, or NoSQL database) or data warehouse. In some examples, data store 226 can include a corpus or a relational database with one or more tables, arrays, indices, stored procedures, and so forth to enable data access. Data store 226 can store data for the operations of processes, applications, components, or modules stored in computer-readable media 222 or computer instructions in those modules executed by processing units 220. In some examples, the data store can store computer program instructions 228 (e.g., instructions corresponding to apps, to processes described herein, or to other software executable by processing units 220), a computational model 230 such as discussed below, or any combination thereof. In some examples, the computer program instructions 228 include one or more program modules executable by the processing units 220, e.g., program modules of an app.

The computing device 200 can also include a communications interface 232, which can represent communications interface 126. For example, communications interface 232 can include a transceiver device such as a network interface controller (NIC) to send and receive communications over a network 108 (shown in phantom), e.g., as discussed above. As such, the computing device 200 can have network capabilities. For example, the computing device 200 can exchange data with computing devices 102 or 104 (e.g., laptops, computers, and/or servers) via one or more networks 108, such as the Internet. As discussed above, sensors 218 can include components of communications interface 232.

In some examples, the processing units 220 can access the modules on the computer-readable media 222 via a bus 234, which can represent bus 116, FIG. 1. I/O interface 216 and communications interface 232 can also communicate with processing units 220 via bus 234.

The modules of the feature engine 202 stored on computer-readable media 222 can include one or more modules, e.g., shell modules, or application programming interface (API) modules, which are illustrated as a feature module 236.

The modules of the analysis engine 204 stored on computer-readable media 222 can include one or more modules, e.g., shell modules, or application programming interface (API) modules, which are illustrated as an analysis module 238 and a communications module 240.

The modules of the training engine 206 stored on computer-readable media 222 can include one or more modules, e.g., shell modules, or application programming interface (API) modules, which are illustrated as a feature-determining module 242, one or more learning modules 244, and a modeling module 246.

The modules of the reporting engine 208 stored on computer-readable media 222 can include one or more modules, e.g., shell modules, or application programming interface (API) modules, which are illustrated as a program-execution module 248 and a data-exchange module 250.

In the feature engine 202, analysis engine 204, training engine 206, or reporting engine 208, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the analysis module 238 and the communications module 240, or the feature module 236 and the communications module 240, can be combined in a single module that performs at least some of the example functions described below of those modules. In another example, the feature module 236 and the feature-determining module 242 can be combined in a single module that performs at least some of the example functions described below of those modules. Such a combined module can be shared by or accessible to both the feature engine 202 and the training engine 206. In some examples, computer-readable media 222 can include a subset of modules 236, 238, 240, 242, 244, 246, 248, or 250.

In some examples, specialized hardware or logic blocks can be used to collect trace data or other execution-related information to include, e.g., in a crash report. Such logic blocks can be implemented on a CPU or a different microchip. The analysis engine 204 can be executed, e.g., on an FPGA for speed. In some examples using multiple classification modules, e.g., as discussed below with reference to FIG. 4, a multi-core processor (e.g., an FPGA running multiple soft macro CPUs) can be used to execute the analysis engine 204, e.g., using one core per classification module. FPGAs or other logic devices can also be used to accelerate training of the computational model 230, e.g., determining of the computational model 230 using machine-learning techniques that process a set of training data.

Figure 3:
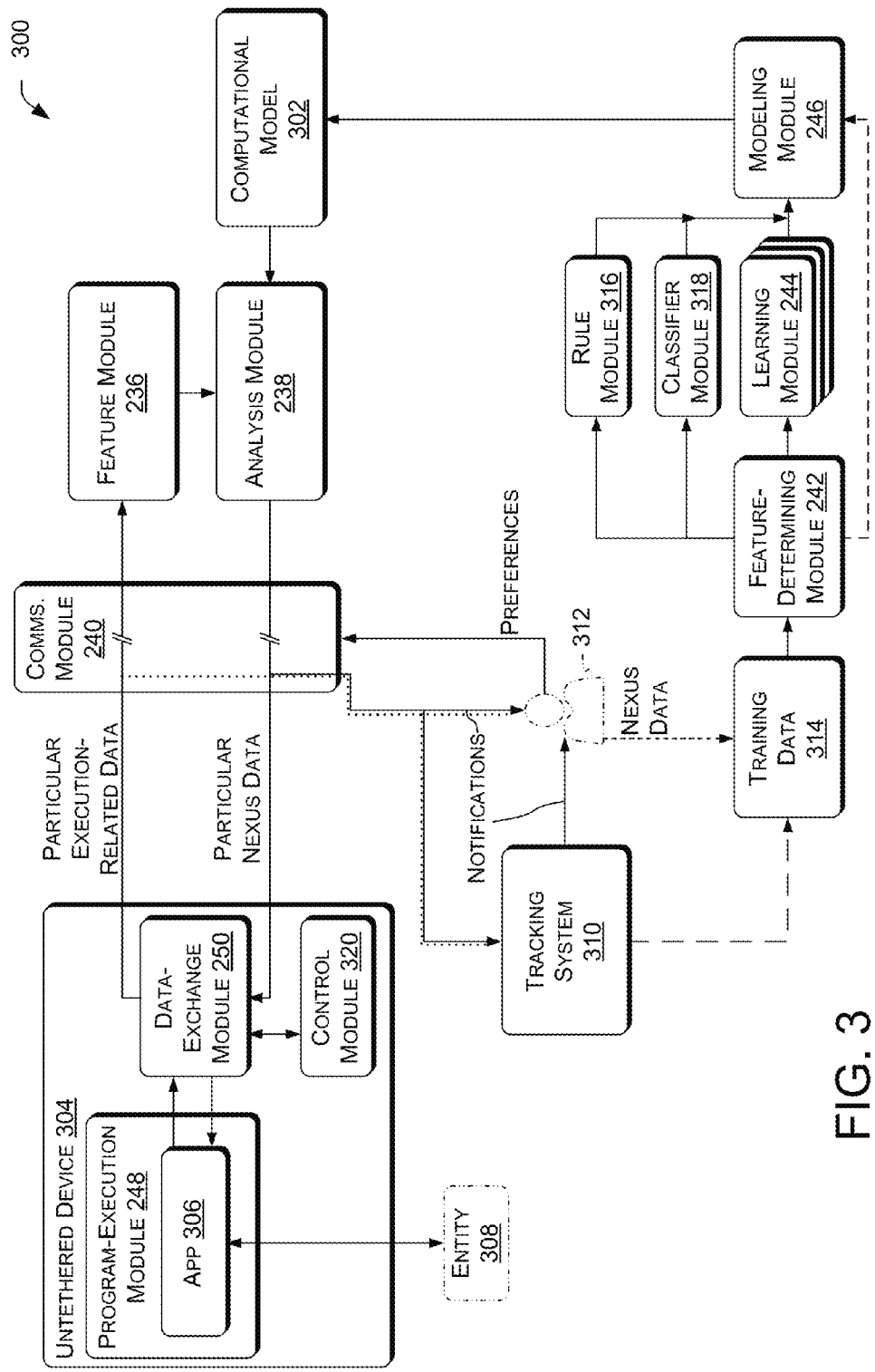
FIG. 3 is a dataflow diagram depicting example module interactions during operation of an untethered device, determination of a nexus, and training of a computational model.

FIG. 3 is a dataflow diagram 300 illustrating example interactions between the modules illustrated in FIG. 2. Some of the modules make use of a computational model 302, which can represent the computational model 230, FIG. 2. The computational model 302 can be stored on the computer-readable media 222, FIG. 2. The computational model 302 can map execution-related data to nexus data. The execution-related data corresponds to a software program, e.g., executed on an untethered computing device or another computing device 102 or 104. For example, the execution-related data can include a crash report of a smartphone app, or a failure report from an embedded sensor node or mote. In some examples, the computational model 302 can include a machine-learning model, e.g., a classifier such as a two-class decision jungle.

The execution-related data can include data useful in determining nexus data of a bug. The execution-related data can include at least data representative of the state of an untethered device and/or data representative of the state of an app running on the untethered device. In some examples, the execution-related data includes data representative of the state of an untethered device, e.g., data of external resource availability, e.g., a battery life of the untethered device or a radio signal strength of the untethered device; system performance, e.g., a processor usage level (e.g., percent used or percent free) of the untethered device, a memory usage level (e.g., percent or bytes used or free) of the untethered device, an operating-system performance indication of the untethered device (e.g., page-swap counts, swap space in use), a device performance indication of the untethered device (e.g., CPU or GPU speed or voltage, which can be modified by dynamic voltage scaling, or dynamic voltage and frequency scaling, DVFS, or CPU or GPU temperatures), or a network performance indication of the untethered device (e.g., ping time or round-trip time, RTT, to a reference server, hop count to a known server, percentage of packets lost, or bit error rate of the link); or hardware characteristics, e.g., an indication of a hardware type of the untethered device (e.g., a manufacturer name, model number, or Universal Serial Bus Vendor ID and/or Product ID).

The execution-related data can additionally or alternatively include data representative of the state of an app running on the untethered device, e.g., data of an execution environment of the app, e.g., an identifier of the app or other software program, an identifier of another software program running on the untethered device concurrently with the app, an indication of an operating-system version of the untethered device, configuration data of the software program, configuration data of the untethered device, or one or more debug symbols of the software program; or an execution record of the app, e.g., a stack trace of the app, an indication of an exception thrown by the app, an indication of a last function called by the app, an indication of a function in the app in which the exception was thrown, or an indication of an event handler of the app executing when the exception was thrown.

In some examples, an untethered device 304 or other computing system 102 or 104 can run or otherwise host an app 306. For example, the program-execution module 248 can execute one or more program module(s) of the app 306, e.g., computer program instructions 228, FIG. 2. The program-execution module 248 can include, e.g., a security sandbox or a loader routine. The app 306 can interact with an entity 308, such as a user, another program, or another device, or can be a non-interactive program such as a sensor-reading and -reporting program. The app 306 can provide particular execution-related data, e.g., to the feature module 236. The particular execution-related data can include any combination of information such as the examples given above. In some examples, the app can include as particular execution-related data any information accessible to the app. In some examples, the app can provide at least some of the particular execution-related data to the feature module 236 via crash-reporting service(s) or other intermediar(ies).

The app 306 can provide the particular execution-related data via the data-exchange module 250, which can transmit execution-related data corresponding at least in part to the program module of the app 306 via the communications interface 232, FIG. 2. The data-exchange module 250 can be separate from the app 306, as shown in FIG. 3, or can be part of the app 306, or can be divided between the app 306 and other modules of the untethered device 304, e.g., the operating system 118, FIG. 1. In some examples, the data-exchange module 250 can transmit and receive data, e.g., via an HTTP connection carrying API messages in the representational state transfer (REST) or Web Services styles.

In some examples, the feature module 236 can be configured to determine one or more execution features based at least in part on the particular execution-related data. The feature module 236, to determine the execution features, can, e.g., summarize, extract, parse, filter, correlate or transform (or any combination of any of those) values in the particular execution-related data and/or compute functions of values in the particular execution-related data or values summarized, extracted, parsed, filtered, correlated or transformed from the particular execution-related data. The feature module 236 can additionally or alternatively query databases or other data sources, e.g., program module or function documentation or mappings between 32-bit exception codes (e.g., HRESULTs) and exception names or meanings, using keys included in or summarized, extracted, parsed, filtered, correlated or transformed from the particular execution-related data, and provide the query results or values summarized, parsed, filtered, correlated or transformed from the query results as the execution features.

Table 2 shows an example of particular execution-related data including a crash report. Table 3 shows an example of execution features derived from the report in Table 2. Table 4 shows example functions carried out by the feature module 236 to determine the execution features in Table 3 from the particular execution-related features in Table 2. Throughout Tables 2, 3, and 4, underlined numbers in angle brackets, e.g., "<1>," correlate data and rules and are not part of the execution-related data or the execution features. In Tables 3 and 4, "STFunc0" is the currently-executing function (part of a stack trace, hence "ST"), "STFunc1" is the caller of that function, and so on. Stack traces can be provided per-thread for a multithreaded app.

TABLE 2

<1> 372342,0: <2>TransitTracker.BusPredictionManager.ReadCompleted
<3> 1: System.Net.WebClient.OnOpenReadCompleted
<4> 2: System.Net.WebClient.OpenReadOperationCompleted,
<5>16, <6>−45

TABLE 3

| Feature | Value |
|---|---|
| Application ID | 372342 <1> |
| ExceptionType | WebException <2> |
| STFunc0 | TransitTracker.BusPredictionManager.ReadCompleted <2> |
| STFunc1 | System.Net.WebClient.OnOpenReadCompleted <3> |
| STFunc2 | System.Net.WebClient.OpenReadOperationCompleted <4> |
| CrashFunction | System.Net.WebClient.OpenReadOperationCompleted <4> |
| CrashClass | System.Net.WebClient <4> |
| FreeMem | 16 <5> |
| IsMemAvailable | −1 |
| RSS | −45 <6> |
| EventHandler | ReadCompleted <2> |

TABLE 4

| Rule | Execution-related data | Operation | Execution feature |
|---|---|---|---|
| <1> | 372342 | Extract | Application ID: 372342 |
| <2> | Event Handler ReadCompleted | Lookup in a table of exceptions that ReadCompleted can throw | ExceptionType: WebException |
| <2> | Event Handler ReadCompleted | Extract | EventHandler: ReadCompleted |
| <2> | Event Handler ReadCompleted | Extract | STFunc0: ReadCompleted |
| <3> | Function Name OnOpenReadCompleted | Extract | STFunc1: OnOpenReadCompleted |
| <4> | Function Name OpenReadOperationCompleted | Extract | STFunc2: OpenReadOperationCompleted |
| <5> | 16 | Parse | FreeMem: 16 mb |
| <6> | −45 | Parse | RSS: −45 dBm |

In some examples, the feature module 236 is configured to determine at least one of the execution features as a binary indication of whether a specific exception has been raised. In some examples, the feature module 236 is configured to determine at least one of the execution features as a symbol name corresponding to a crash address, e.g., determined using debug symbols for the app. In some examples, the feature module 236 is configured to determine at least one of the execution features by binning at least one data value included in the execution-related data. The feature module 236 can bin, e.g., by fives or tens, or any other bin width. The bin widths can be constant or can vary linearly, logarithmically, or exponentially as a function of bin number or of the values being binned. For example, the feature module 236 can determine one of the execution features as the amount of free memory, binned to, e.g., one-kilobyte or one-megabyte bins or increments. In some examples, the feature module 236 is configured to determine at least one of the execution features by thresholding at least one data value included in the execution-related data. For example, the feature module 236 can determine one of the execution features as a Boolean indication of whether radio signal strength exceeds a selected threshold, e.g., −60 dBm. In some examples, the feature module 236 can determine one of the execution features as a mathematical function of a value in the execution-related data, e.g., as a square, cube, or other power of a value, or as a multiple or fraction of a value; as a threshold or clipped version of a value; as a derivative or integral (1-fold or n-fold, n>1) of a series of data found in the execution-related data, or as a filtered version of such a series of data. In some examples, the feature module 236 can determine one of the execution features as a result of natural-language processing (NLP) analysis of execution-related data, e.g., of user inputs or stack traces. For example, the feature module 236 can search for specific function names within a stack trace. In some examples, the feature module 236 can determine one of the execution features as a result of combining individual features. For example, given two features $F_1$ and $F_2$, a new feature $F_3$ can be determined, e.g., as $F_1+F_2$ or $F_1 \times F_2$.

In some examples, the analysis module 238 can be configured to determine particular nexus data corresponding to the particular execution-related data. The analysis module 238 can make this determination based at least in part upon the stored computational model 302 and based at least in part on the determined execution features from the feature module 236. In some examples, the analysis module 238 can query the computational model 302 using features received from the feature module 236. In some examples, the nexus data can include, e.g., an indication of a memory depletion (e.g., below a selected percent or number of bytes of RAM free), a secondary-storage depletion such as a "disk full" condition (e.g., below a selected percent or number of bytes of secondary storage free), an input overrun (e.g., more than a selected number of input events received in a selected period of time or during the execution of a selected event handler), a proxy error, an invalid or missing data input, an invalid sensor reading (e.g., from a GPS receiver or accelerometer), a network connectivity failure (e.g., insufficient signal strength on a wireless data network link), a server response error (e.g., an HTTP 401, 404, 405, or 502 response), an overheating event, or a low- or insufficient-battery condition. Various examples of the operation of the analysis module 238 are discussed below and with reference to FIGS. 4-11.

In some examples, the analysis module 238 can be configured to determine tentative nexus data values for the execution features of the particular execution-related data using respective ones of a plurality of classification modules. The classification modules can include various types of classifiers or clustering modules such as those discussed below with reference to learning modules 244. The analysis module 238 can be further configured to provide, as the particular nexus data, a most-commonly-occurring one (e.g., a statistical mode) of the tentative nexus data values. For example, the analysis module 238 can implement a majority-vote technique of selecting a nexus data value from among the tentative nexus data values provided by the classification modules. Classification modules are discussed below with reference to FIG. 4.

In some examples, the communications module 240 can be configured to receive the particular execution-related data via the communications interface 232, FIG. 2, and to transmit at least some of the determined particular nexus data via the communications interface 232. For example, the communications module 240 can receive the particular execution-related data from the untethered device 304 and transmit the determined particular nexus data to the untethered device 304 and/or a tracking system 310 accessible by a developer 312 (shown in phantom) of the app 306, e.g., a BUGZILLA system. The communications module 240 can additionally transmit execution-related data corresponding to the particular nexus data to the tracking system 310 or the developer 312, as graphically indicated by the dotted lines.

The data-exchange module 250 can be configured to receive the particular nexus data via the communications interface 232 and provide the particular nexus data, e.g., to the app 306, the operating system 118, or other modules running on the untethered device 304. At least one of those modules, e.g., the data-exchange module 250 or the app 306, can present an indication of the particular nexus data via the user interface 210, FIG. 2.

The feature module 236, the analysis module 238, the computational model 302, and/or the communications module 240 can be embodied in a cloud service, or on a computing device 102 controlled by the developer 312, or on the untethered device 304 (in which case the communications module 240 can implement inter-process communications, IPC, functions), or any combination thereof.

In some examples, the communications module 240 and/or the tracking system 310 can be configured to provide email, instant message (IM), newsfeed, or other "push" or "pull" notifications to developers when bugs occur. The notifications can include at least some of the particular nexus data. The notifications can additionally include at least some of the particular execution-related data. Notifications can be provided for only a subset of determined particular nexus data items, e.g., for nexuses the developer 312 has not yet seen in the app 306. Notifications can also be provided based on preferences of the developer 312. For example, a developer 312 can request notifications for all bugs in a recently-updated app 306 in order to quickly fix errors not detected during pre-release testing of the upgrade. This can permit correlating crash reports with external factors in the development process, e.g., software lifecycle factors. In some examples, the developer 312 can provide preferences indicating filters. The communications module 240 and/or the tracking system 310 can provide the developer 312 notifications of bugs matching conditions specified in the filters. Conditions can be set, e.g., on the product, product version, hardware, or operating system (OS) under which the bug was exhibited, the status, severity, or priority of the bug, a classification of the bug, a component to which the bug relates, the nexus data, a resolution indicator of the bug, text in comments about the bug, the reporter of the bug, or other types of information, e.g., stored in bug-tracking systems such as BUGZILLA or CODEPLEX.

In some examples, the communications module 240 and/or the tracking system 310 can be configured to provide the developer 312 with statistics or reports regarding received execution-related data and corresponding nexus data, e.g., in a "dashboard" format. For example, the tracking system 310 can provide statistics or reports via a Web-page interface or an API, e.g., a REST API or Web Service. Such APIs can be provided, e.g., by cloud services such as MICROSOFT AZURE ML. Reports can include push notifications of report updates and/or percentages of bugs falling under various nexuses, for example.

In some examples, the modeling module 246 can be configured to determine the computational model 302 based at least in part on execution features of a plurality of execution-related data records and respective nexus data values. Further details of such determining, e.g., training using machine-learning techniques applied to a training data set, are given below with reference to FIGS. 4, 7, 8, and 9. In some examples, the modeling module 246 can be configured to train the computational model 302 based at least in part on training data 314. The training data 314 can be provided, e.g., by the developers, a system administrator, or collected from users via crowdsourcing, or using an existing data repository. Data from the tracking system 310 can be incorporated into the training data 314 or used in constructing the training data 314, as graphically indicated by the dashed arrow. This can permit continuously improving the accuracy and/or expanding the scope of the computational model 302. For example, the developer 312 can investigate reported bugs and determine corresponding nexus data. The developer 312 can then add the nexus data to the training data 314 in association with the corresponding particular execution-related data, as graphically indicated by the dashed arrow.

In some examples, the training data 314 include one or more execution-related data records, each corresponding to a software program and an untethered device, and one or more respective nexus data values. The untethered device(s) referenced in the training data 314 can be actual or simulated devices. For example, a crash-reporting system, such as the Windows Phone Error Reporting (WPER) system or Dr. Watson, can provide the execution-related data records. In some examples, human-guided machine learning or data-mining techniques can provide the respective nexus data values. In some examples, online forum posts or other experiences of users and programmers can provide the respective nexus data values.

In some examples, the feature-determining module 242 can receive the training data 314. The feature-determining module 242 can be configured to determine one or more execution features of individual ones of the execution-related data records. This can be done, e.g., as described above with reference to the feature module 236, FIGS. 2 and 3. In some examples, the feature-determining module 242 can provide the determined execution features to the modeling module 246, or to one or more learning modules 244.

In some examples, individual ones of the learning modules 244 can be configured to classify the execution features of the execution-related data records with respect to the nexus data values. For example, the learning modules 244 can be configured to determine a set of the execution features correlated with the nexus data values. In some examples, two or more different learning modules 244 can perform this classification, e.g., in parallel on a cloud service. For example, the learning modules can include Bayesian classifiers, adaptive boosting classifiers, bagging classifiers, support vector machines, decision trees, decision forests, decision jungles, neural networks or perceptrons, regression-based classifiers such as logistic-regression classifiers, linkage-clustering modules, centroid-clustering modules, or other classification or cluster-analysis modules, e.g., implementing ensemble techniques. The learning modules 244 can be configured to perform, e.g., support vector machine (SVM), neural network, deep neural network, two-class, multiclass, or one-versus-all classification (e.g., using one learner per class).

In some examples, the modeling module 246 can be configured to determine, based at least in part on the execution features of the execution-related data records and the respective nexus data values, the computational model 302 to determine a particular nexus data value for particular execution-related data. Examples are discussed below with reference to FIG. 4. Once the computational model 302 has been provided, the feature module 236 can receive particular execution-related data from a particular untethered device 304, the analysis module 238 can determine the particular nexus data using the trained computational model 302, and the communications module 240 can transmit the determined particular nexus data to the particular untethered device 304. In some examples, the feature module 236 and the feature-determining module 242 can determine one or more features in common, e.g., they can determine the same set of features.

In some examples, the program-execution module 248 or the app 306 can provide the particular execution-related data on a schedule, or at random times, or in response to a bug. For example, the program-execution module 248 or the app 306 can catch an exception thrown by an executed program module of the app 306 and, in response, transmit the particular execution-related data and receive the particular nexus data within an exception handler corresponding to the caught exception. In some examples, the particular nexus data can include an indication of whether or not the nexus is a condition external to the program module, i.e., beyond the control of the program module. In some of these examples, the program-execution module 248 or the app 306 can execute the program module of the app 306 again in response to the nexus data value indicating a condition external to the program module. This can permit the app 306 to continue operating, e.g., without presenting an error message to the user, if the nexus is not the app 306 itself and if retrying execution of the program module succeeds.

In some examples, the untethered device 304 includes a sensor 218, as discussed above with reference to FIG. 2. In some of these examples, the executing the program module includes attempting to read particular sensor data from the sensor 218. For example, the computer program instructions 228 of the app 306 can include instructions executable by the processing units 220 to attempt to read a location of the untethered device 304 using a GPS sensor 218. If the GPS sensor 218 is unable to lock on to the GPS satellite signals and provide a location, an exception can be thrown. The exception can be handled as discussed above, in some examples. This example exception corresponds to a nexus external to the app 306, since the app 306 generally cannot control the location of the untethered device 304 or radio propagation characteristics near the untethered device 304 at GPS wavelengths.

In some examples, the untethered device 304 can transmit particular execution-related data in the absence of a bug. For example, app 306 running on the untethered device 304 can transmit performance counters, values of significant state variables, sensor readings, time running (wall-clock or CPU), thread names and states, or other execution-related data on a schedule. This can permit the analysis module 238 to determine whether the app 306 is responding normally or is in a state likely to lead to a bug. In some examples, if app 306 detects an anomalous or unexpected condition that does not cause a bug, app 306 can transmit corresponding particular execution-related data to the analysis module 238 and receive corresponding particular nexus data. App 306 can then adjust its operation based on the nexus data to avoid a bug, e.g., by saving work done by user 308 and terminating gracefully, or by restarting. Such anomalous or unexpected conditions can sometimes be identified in source code by do-nothing code blocks bearing comments such as "this shouldn't happen." In some examples, such blocks in app 306 can be replaced with code to interact with the analysis module 238 as described above.

In some examples, other modules can be configured to classify the execution features of the execution-related data records with respect to the nexus data values instead of or in addition to the learning module 244. In some examples, a rule module 316 is used. The rule module 316 can classify the execution features according to predetermined rules. In some examples, the rule module 316 can include a table specifying patterns or values of one or more execution features or combinations thereof, and corresponding nexus data values. For example, a rule can specify that an "InvalidOperation" exception thrown by the "NavigationService.Navigate" system function corresponds to an impatient user, e.g., to nexus data value 3 in Table 1. In some examples, a classifier module 318 implementing another classification technique can be used to perform this classification.

In some examples, the untethered device 304 further includes a control module 320 configured to control the operation of the data-exchange module 250. In various examples, the control module can be hosted externally, such as in a datacenter hosting analysis module 238, etc. In such examples, the untethered device 304 can include a corresponding control module that can operate as a client execution agent. The control module 320 permits trading off the resource requirements of the data exchange module 250 and the accuracy or timeliness of the particular nexus data. In some examples, the control module 320 causes the data-exchange module 250 to transmit a relatively lower volume of particular execution-related data, or to transmit particular execution-related data relatively less often. The relatively lower volume of the particular execution-related data can include a subset of the execution-related data or lower-resolution data values (e.g., 4 bits instead of 8 bits per value). Transmissions made relatively less often can include particular execution-related data captured a selected delay time before the transmission, or multiple data values of the particular execution-related data held for transmission in a batch. These examples can reduce consumption of a battery of the untethered device 304 from transmission of the execution-related data or can reduce the cost or bandwidth of mobile data transmissions.

In some examples, the control module 320 causes the data-exchange module 250 to transmit a relatively higher volume of particular execution-related data (e.g., not a subset, a larger subset, or higher-resolution values), or to transmit particular execution-related data relatively more often. These examples can provide increased timeliness and accuracy of the particular nexus data.

The control module 320 can adjust the amount, resolution, and timeliness of transmissions by the data-exchange module 250 to satisfy selected criteria for resource consumption, timeliness of the particular nexus data, and accuracy of the particular nexus data. The criteria can be provided, e.g., via a user interface 210 of the untethered device 304. Some examples include criteria only on resource consumption; the control module 320 can adjust data transmissions to provide the highest accuracy and timeliness within those criteria. Some examples include criteria only on accuracy; the control module 320 can adjust data transmissions to provide the highest timeliness and lowest resource consumption within those criteria. Some examples include criteria on resource consumption and either or both of accuracy and timeliness; the control module 320 can adjust data transmissions to provide the highest accuracy and timeliness within those criteria.

Figure 4:
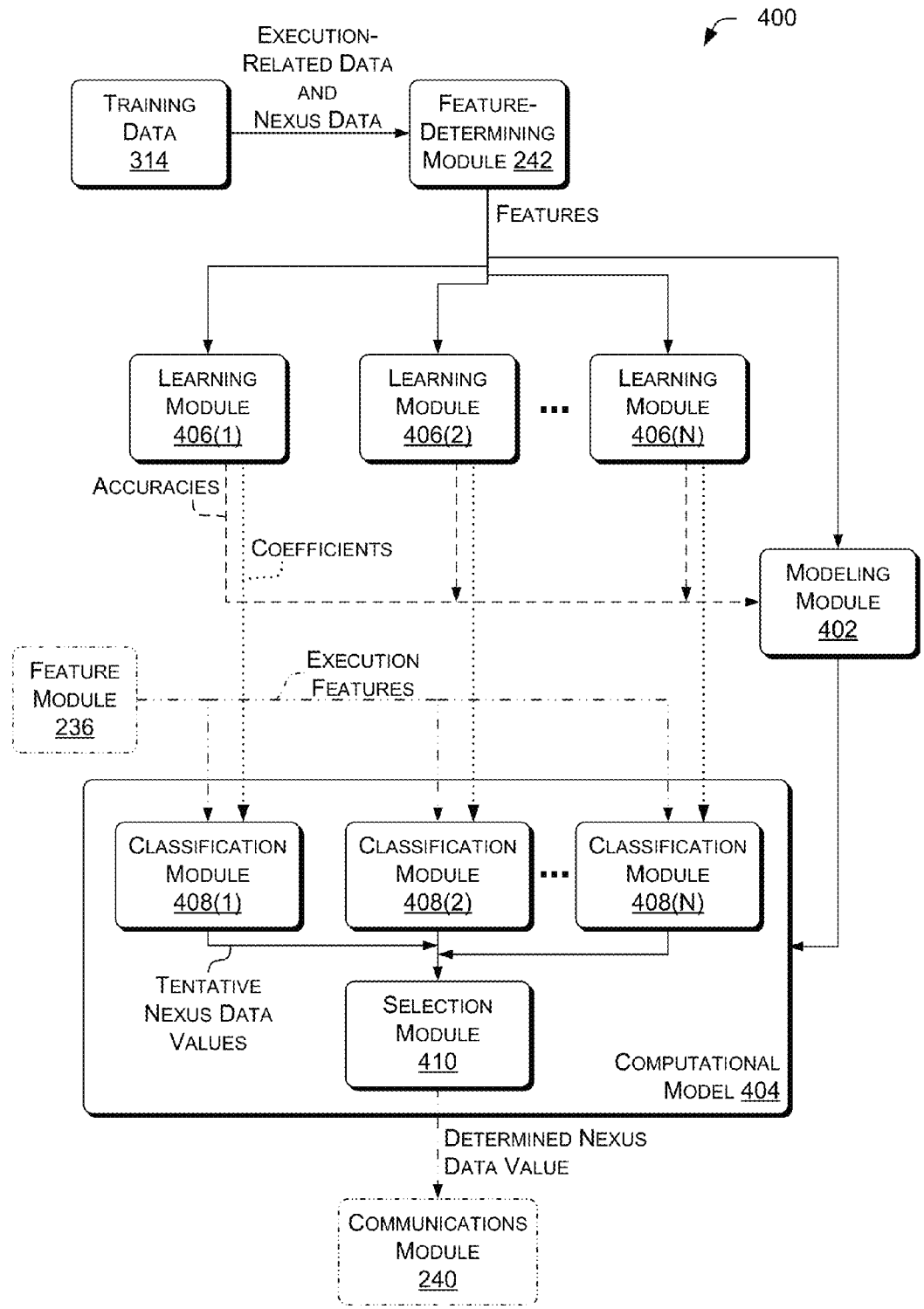
FIG. 4 is a dataflow diagram depicting example module interactions during training of a computational model for nexus determination.

FIG. 4 is a dataflow diagram 400 illustrating some examples of training a computational model 302. The feature-determining module 242 can be configured to receive the execution-related data records and the respective nexus data values. In some examples, the modeling module 402, which can represent the modeling module 246, FIG. 2, can be configured to provide the computational model 404, which can represent the computational model 302.

In some examples, the modeling module 402 can be configured to determine a respective significance of individual ones of the execution features from the feature-determining module 242. In some examples, the modeling module 402 selects which of the execution features are most useful based on the training data 314. The modeling module 402 in this example can be configured to provide the computational model 404 having as inputs individual ones of the execution features having at least a selected significance, or having a significance rank within a selected number of a highest-significance one of the execution features (e.g., the top three, five, or ten, etc. most-significant features). Providing the computational model 404 having as inputs only sufficiently-significant ones of the execution features can reduce the time and memory required to execute the computational model 404 in the analysis module 238 while maintaining acceptable accuracy in nexus determination.

For example, an analysis of variance (ANOVA) analysis of nexus data output by the computational model 404 with respect to the different execution features (e.g., the types listed in the left column of Table 2, above) can be performed to determine which execution features meaningfully differentiate the nexuses. The significance of an execution feature can be determined as or based upon the statistical significance or confidence limits output by a repeated measures ANOVA or other statistical test, or based upon analysis of the co-variance matrix. Other examples of such tests can include mixed models approaches or non-parametric tests such as a Durbin test.

For example, an app ID may not be a highly significant predictor of the nexus, since any given app 306 can experience bugs with many different nexuses. For example, some individual apps tested under a deliberate fault introduction framework experienced bugs due to multiple, different nexuses. Moreover, mathematical functions of, e.g., app ID or available memory, such as the square of either app ID or free memory, may not be highly significant predictors of a nexus: squaring the app ID provides no more clear information about app behavior than does using the app ID itself, and (free memory) can underestimate the bug-triggering effect of low-memory conditions.

In some examples, the modeling module 402 can provide the computational model 404, e.g., by applying a predetermined set of rules to the features provided by the feature module 242. In some examples, the rules can include nexus information for a plurality of crash buckets, each bucket including, e.g., information of an exception and information of a function in which the exception was raised. The modeling module 402 can provide the computational model 404, e.g., by selecting buckets corresponding to features provided by the feature module 242. Similarly, other logic modules can be used in determining the computational model 404.

Learning modules 406(1)-406(N) (individually or collectively referred to herein with reference 406), where N is any integer greater than or equal to 1, can represent the learning modules 244, FIG. 2. As discussed above with reference to FIG. 3, in some examples, the learning modules 406 can be configured to classify the execution features of the execution-related data records with respect to the nexus data values. The learning modules 406 can provide coefficients (or other parameters) of respective classification modules 408(1)-408(N) in the computational model 404. This is graphically represented by the dotted arrows. The computational model 404 can include fewer than N classification modules. In some examples, the classification modules 408 can operate even if provided fewer inputs than the number of inputs provided to the learning modules 406. For example, the training data 314 provided to the learning modules 406 can include a data value, such as accelerometer measurement, that execution-related data provided from a feature phone may lack. In these examples, at least some of the classification modules 408 can provide a tentative nexus even in the absence of the accelerometer measurement data.

In some examples, a learning module 406 can provide neural-network weights to a classification module 408, which can use a neural network having those weights to determine a tentative nexus data value for particular execution-related data values. In some examples, a learning module 406 can provide to a classification module 408 the boundaries of classification regions in a multi-dimensional space of at least some of the execution features, and the classification module 408 can use those boundaries to determine the classification region for a particular vector of execution-related data values.

In some examples, computational model 404 can include a selection module 410 and a plurality of classification modules 408. The classification modules 408 can be configured to determine tentative nexus data values for the execution features of the particular execution-related data. The selection module 410 can be configured to provide, as the particular nexus data value, a most-commonly-occurring one (e.g., a statistical mode) of the tentative nexus data values. For example, the selection module 410 can implement a majority-vote technique of selecting a nexus data value from among the tentative nexus data values provided by the classification modules 408.

In some examples, the learning modules 406 or accuracy-determining modules (omitted for brevity) can be configured to provide, to the modeling module 402, accuracy values of individual ones of the learning modules with respect to the execution features of the execution-related data records and the respective nexus data values. This is graphically represented by the dashed arrows. The accuracy values can represent, e.g., for what percentage of the execution-related data records the respective learning modules 406 classified the execution features as corresponding to a tentative nexus data value matching the respective nexus data value from the training data 314. In these examples, the modeling module 402 can be configured to provide the computational model 404 including one or more classification modules 408 corresponding to respective ones of the learning modules 406 having at least a selected accuracy value, or having an accuracy rank within a selected number of a highest-accuracy one of the learning modules 406 (e.g., the top three, five, or ten, etc., most accurate learning modules 406).

In some examples, the learning modules 406 or accuracy-determining modules can be configured to determine output-specific accuracy values of individual output nexus data values of individual ones of the learning modules 406 (also represented graphically by the dashed arrows). The output-specific accuracy values can represent, e.g., which percentage of the "memory pressure" bugs were correctly identified by a learning module 406, or which percentage of the "impatient user" bugs. In some examples, if there are n possible nexus values, n respective output-specific accuracy values are determined for each of the, e.g., N learning modules 406.

In these examples, the modeling module 402 can be configured to provide the computational model 404 including one or more classification modules 408 and a selection module 410. The classification modules 408 can correspond to respective ones of the learning modules 406 and can be configured to determine respective tentative nexus data values for the execution features of the particular execution-related data. For example, the classification module 408(1) can determine a tentative nexus data value using a neural network having weights provided by the learning module 406(1), and the classification module 408(2) can determine a tentative nexus data value using a Voronoi spatial decomposition provided by a k-means clustering module in the learning module 406(2).

The selection module 410 in these examples can be configured to provide, as the particular nexus data value, one of the tentative nexus data values having at least a selected output-specific accuracy value for the corresponding tentative nexus data value and learning module. For example, the classification module 408 having the highest accuracy for the tentative nexus data value provided by that classification module 408 can be selected to provide the output particular nexus data value.

Once the modeling module 402 has provided the computational model 404, the computational model 404 can be used to determine nexus data values based at least in part upon execution features provided by the feature module 236 (shown in phantom). The computational model 404 can provide the determined nexus data values to the communications module 240. This dataflow is graphically represented by the phantom arrows.

Illustrative Processes

Figure 5:
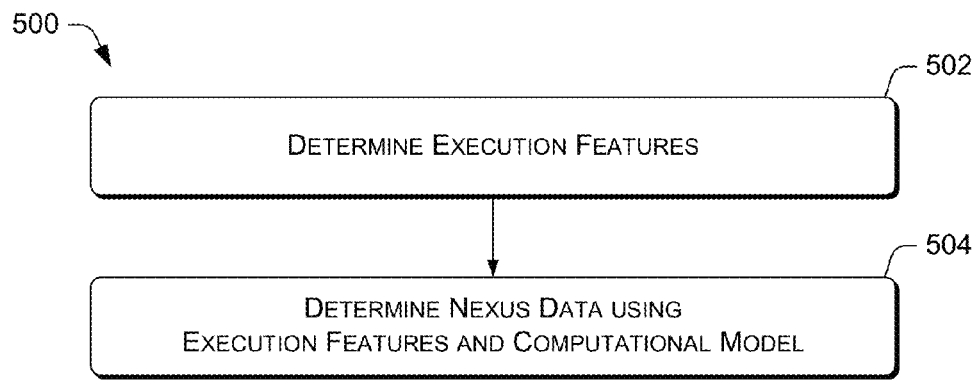
FIG. 5 is a flow diagram that illustrates example processes for determining nexus data corresponding to execution-related data.

FIG. 5 is a flow diagram that illustrates an example process 500 for determining nexus data using a computing device, e.g., computing device 200, FIG. 2. Example functions shown in FIG. 5 and other flow diagrams and example processes herein can be implemented on or otherwise embodied in one or more computing devices 102 or 104, e.g., using software running on such devices. For the sake of illustration, the example process 500 is described below with reference to processing unit 220 and other components of computing device 200, FIG. 2, that can carry out or participate in the steps of the exemplary method. However, other processing units such as processing unit 112 and/or other components of computing devices 102 or 104 can carry out steps of described example processes such as process 500. Similarly, exemplary methods shown in FIGS. 6, 7, 8, 9, 10, and 11 are also not limited to being carried out by any particularly-identified components.

The order in which the operations are described in each example flow diagram or process is not intended to be construed as a limitation, and any number of the described operations can be combined in any order and/or in parallel to implement each process. Moreover, the operations in each of FIGS. 5, 6, 7, 8, 9, 10, and 11 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

At block 502, in some examples, the feature module 236, FIG. 3, can determine one or more execution features based at least in part on particular execution-related data.

At block 504, in some examples, the analysis module 238, FIG. 3, can determine particular nexus data corresponding to the particular execution-related data can be determined based at least in part upon the stored computational model and the determined execution features.

Figure 6:
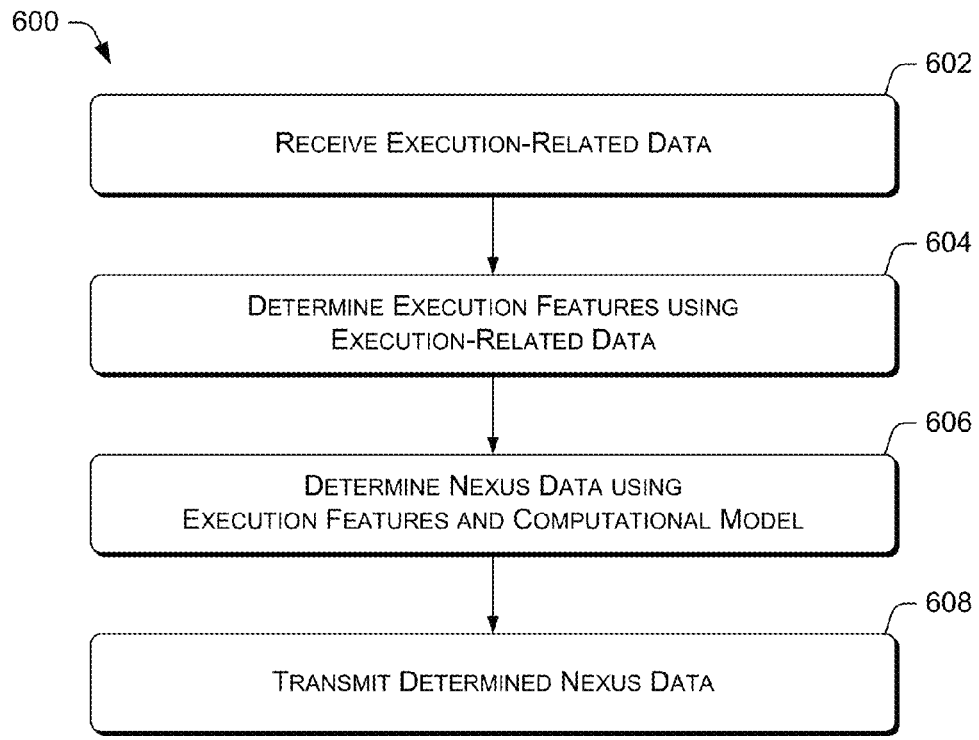
FIG. 6 is a flow diagram that illustrates example processes for determining nexus data corresponding to execution-related data.

FIG. 6 is a flow diagram that illustrates an example process 600 for determining nexus data using a computing device, e.g., computing device 200, FIG. 2.

At block 602, in some examples, the communications module 240 or feature module 236, FIG. 3, can receive particular execution-related data, e.g., via a communications interface 232, FIG. 2.

At block 604, in some examples, the feature module 236, FIG. 3, can determine one or more execution features based at least in part on particular execution-related data.

At block 606, in some examples, the analysis module 238, FIG. 3, can determine particular nexus data corresponding to the particular execution-related data based at least in part upon the stored computational model and the determined execution features.

At block 608, in some examples, the analysis module 238 or communications module 240, FIG. 3, can transmit at least some of the determined particular nexus data via the communications interface 232.

Figure 7:
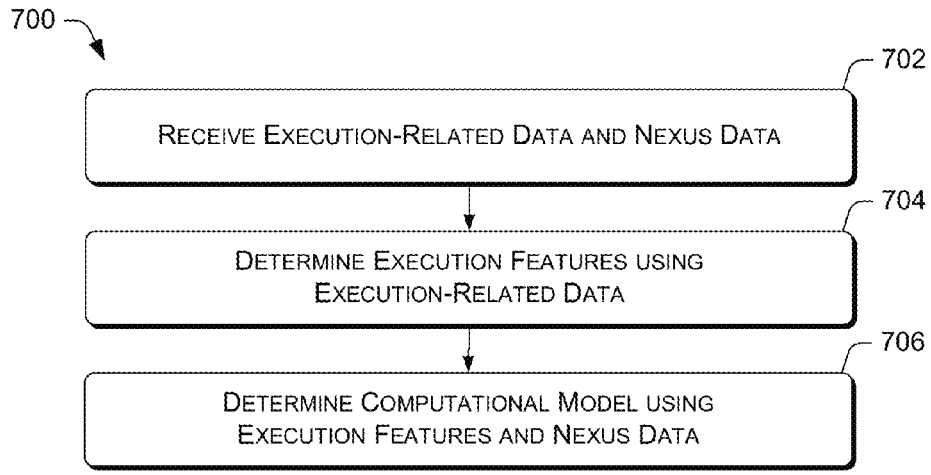
FIG. 7 is a flow diagram that illustrates example processes for training a computational model useful for determining nexus data corresponding to execution-related data.

FIG. 7 is a flow diagram that illustrates an example process 700 for training a computational model such as the computational model 230, 302, or 404. The process 700 can be carried out using a computing device, e.g., computing device 200, FIG. 2.

At block 702, in some examples, the feature-determining module 242 can receive one or more execution-related data records and respective nexus data values corresponding to individual ones of the execution-related data records. The received data records and data values can be included in training data 314, FIG. 3. Each execution-related data record corresponds to a software program, e.g., the app 306, and an untethered device 304, real or simulated. An example is discussed below in the Illustrative Results section. In some examples, a crash-reporting or data-collecting service or a fault-introducing system or other automated testing system can provide the execution-related data records. In some examples, block 702 can include receiving an execution-related data record and a nexus data value. In some examples, block 702 can include receiving a plurality of execution-related data records including the execution-related data record, each of the plurality of execution-related data records corresponding to a software program and an untethered device, and a plurality of corresponding nexus data values including the nexus data value, At block 704, in some examples, the feature-determining module 242, FIG. 3, can determine one or more execution features of individual ones of the execution-related data records. The feature-determining module 242 can carry out a provided script or routine to provide the features. Additionally or alternatively, the feature-determining module 242 can use techniques described above with reference to the feature module 236 to determine candidate features, then select candidate features that are significant with respect to the training data 314, e.g., as described above with reference to the modeling module 402, FIG. 4.

At block 706, in some examples, the modeling module 246, FIG. 3, can determine a computational model. The computational model, e.g., the computational model 404, can be configured to determine a particular nexus data value for particular execution-related data. The modeling module 246 can determine the computational model 404 based at least in part on the execution features of the execution-related data records and the respective nexus data values. For example, the modeling module 246 can operate a clustering or classification algorithm that assigns a specific nexus to particular ranges or combinations of values of the execution features determined from the execution-related data in order to provide the computational model 404. Examples are discussed above with reference to the learning modules 406 and classification models 408, FIG. 4. In some examples, the computational model 404 can include n classification models 408, n≥1.

Figure 8:
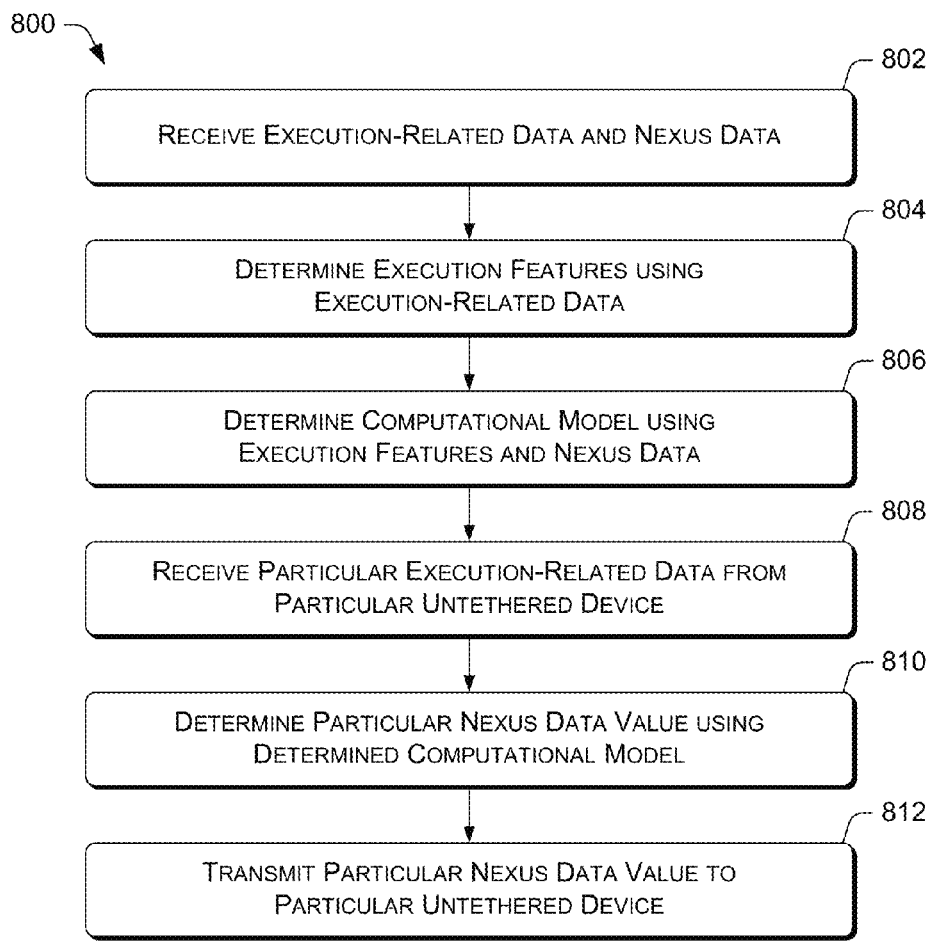
FIG. 8 is a flow diagram that illustrates example processes for training a computational model and for determining particular nexus data corresponding to particular execution-related data.

FIG. 8 is a flow diagram that illustrates an example process 800 for training a computational model such as the computational model 230, 302, or 404. The process 800 can be carried out using a computing device, e.g., computing device 200, FIG. 2.

At block 802, in some examples, the feature-determining module 242 can receive execution-related data records and respective nexus data values.

At block 804, in some examples, execution features of individual ones of the execution-related data records can be determined. This can be done, e.g., as described above with reference to block 704, FIG. 7.

At block 806, in some examples, the feature-determining module 242, FIG. 3, can determine a computational model. The computational model can be configured to determine a particular nexus data value for particular execution-related data.

At block 808, in some examples, the feature module 236 or the communications module 240 can receive the particular execution-related data from a particular untethered device 304. This can be done, e.g., as described above with reference to block 602, FIG. 6.

At block 810, in some examples, the analysis module 238, FIG. 3, can determine the particular nexus data value based at least in part on the determined computational model.

At block 812, in some examples, the analysis module 238 or communications module 240, FIG. 3, can transmit the determined particular nexus data value to the particular untethered device 304.

Figure 9:
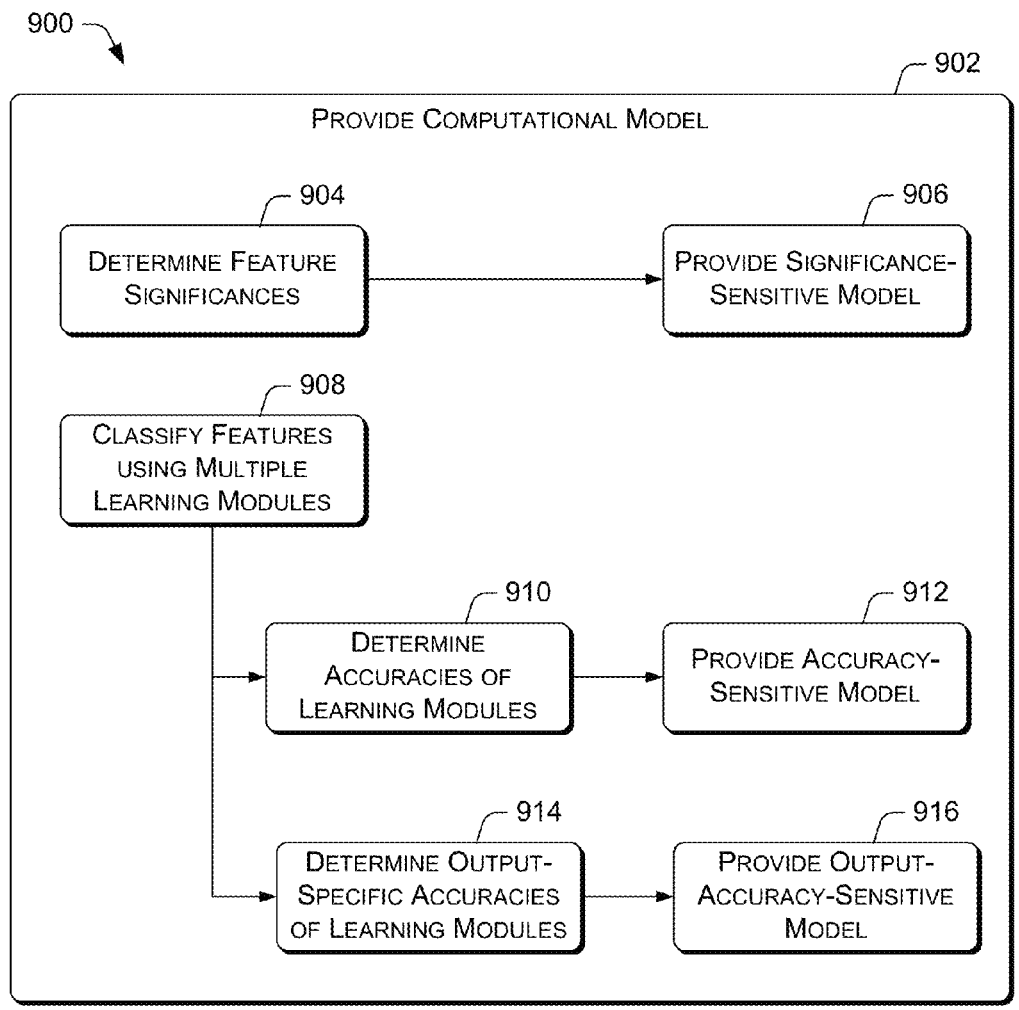
FIG. 9 is a flow diagram that illustrates example processes for training a computational model useful for determining nexus data corresponding to execution-related data.

FIG. 9 is a flow diagram that illustrates an example process 900 for determining a computational model. Blocks of process 900 can be executed, or acts discussed below with reference to such blocks carried out, as part of block 706, FIG. 7, or block 806, FIG. 8.

At block 902, in some examples, the modeling module 402, FIG. 4 can determine the computational model 404. Block 902 can include various blocks discussed below. Accordingly, in some examples, processing of block 902 can begin with block 904 or block 908.

At block 904, in some examples, the modeling module 402 can determine respective significances of individual ones of the execution features can be determined.

At block 906, in some examples, the modeling module 402 can provide the computational model 404 having as inputs individual ones of the execution features selected based on significance. This is referred to for brevity as a "significance-sensitive" computational model. In some examples, the selected individual ones of the execution features are those having at least a selected significance, or having a significance rank within a selected number of a highest-significance one of the execution features, e.g., the top three most significant.

At block 908, in some examples, two or more different learning modules 406, FIG. 4, classify the execution features of individual ones of a plurality of execution-related data records with respect to the corresponding ones of a plurality of nexus data values. In some examples, conflicts between the various learning modules 406 can be resolved by reference to human-provided reference data or by confidence levels output by the learning modules 406.

At block 910, in some examples, the learning modules 406 or the modeling module 402 can determine accuracy values of individual ones of the learning modules 406 can be determined with respect to individual ones of the plurality of execution features of the execution-related data records and corresponding ones of the plurality of nexus data values.

At block 912, in some examples, the learning modules 406 or the modeling module 402 can provide the computational model 404 including one or more classification modules 408 selected based on the determined accuracy values of respective ones of the learning modules 406. This is referred to for brevity as an "accuracy-sensitive" computational model. Each of the classification modules 408 can correspond to a respective one of the learning modules 406 having at least a selected accuracy value, or having an accuracy rank within a selected number of a highest-accuracy one of the learning modules (e.g., the top three most accurate).

At block 914, in some examples, the learning modules 406, classification modules 408, and selection module 410, all FIG. 4, can cooperate to determine output-specific accuracy values of individual output nexus data values of individual ones of the learning modules. The output-specific accuracy values can be determined, e.g., based at least in part on individual ones of the plurality of execution-related data records and the corresponding ones of the plurality of nexus data values. This permits using different models for different nexuses or classes of nexuses.

At block 916, in some examples, the modeling module 402 can provide the computational model 404 responsive to the output-specific accuracy values. This is referred to for brevity as an "output-accuracy-sensitive" computational model. In some examples, the computational model 404 can be configured to determine one or more tentative nexus data values for the execution features of the particular execution-related data using the classification modules 408 corresponding to respective ones of the learning modules 406. The computational model 404 can additionally be configured to provide, as the particular nexus data value, one of the tentative nexus data values having at least a selected output-specific accuracy value for the corresponding tentative nexus data value and learning module or having a highest-ranked output-specific accuracy value for the corresponding tentative nexus data value and learning module. For example, the computational model 404 can output the tentative nexus data value in which the corresponding classification module 408 is most confident out of a plurality of the classification modules 408.

Figure 10:
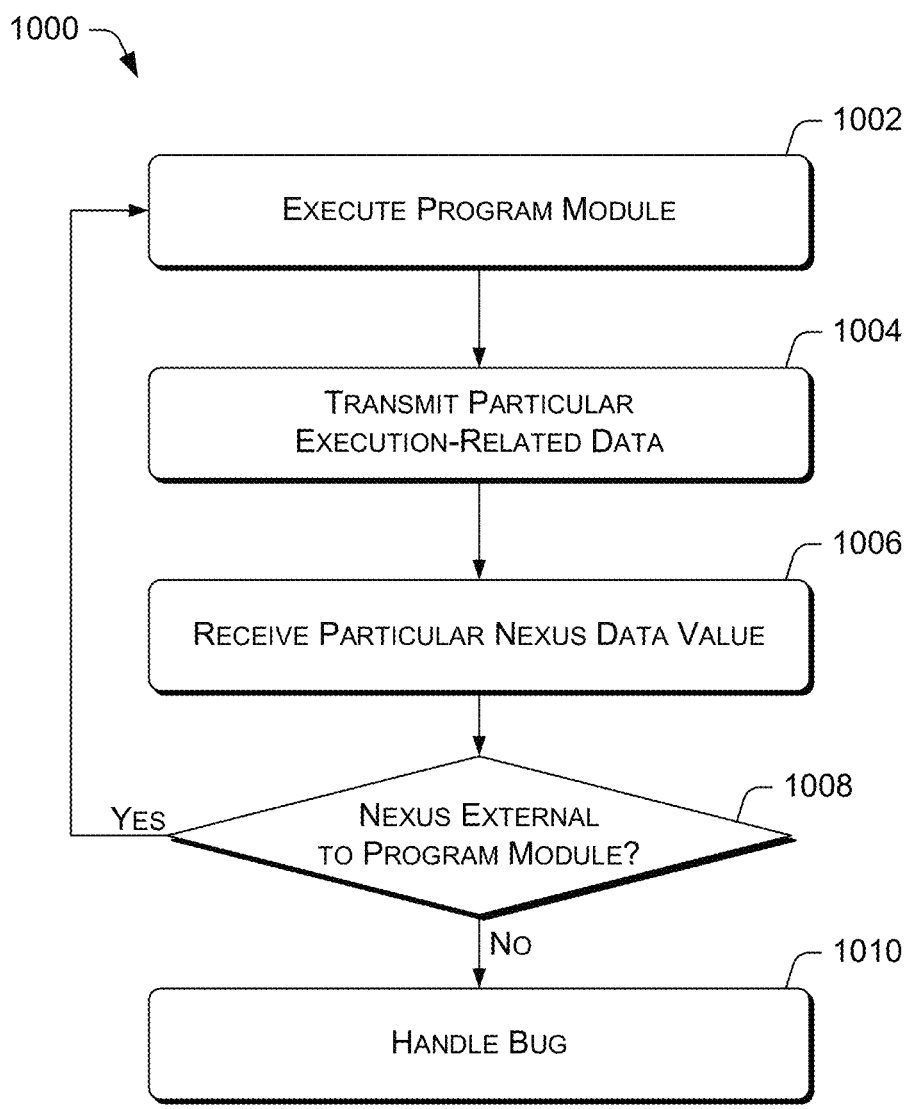
FIG. 10 is a flow diagram that illustrates example processes for responding to a bug, e.g., at an untethered device.

FIG. 10 is a flow diagram that illustrates an example process 1000 for responding to a bug.

At block 1002, in some examples, the program-execution module 248, FIG. 3, can execute a program module, e.g., of the app 306.

At block 1004, in some examples, the data-exchange module 250, FIG. 3, can transmit execution-related data corresponding at least in part to the program module via the communications interface 232.

At block 1006, in some examples, the data-exchange module 250 can receive a nexus data value via the communications interface 232. For example, the data-exchange module 250 can receive the nexus data value from an analysis module 238.

At decision block 1008, in some examples, the program-execution module 248, one or more of the processing units 220, or another component or components of the computing device 200 can determine whether the nexus data value indicates a condition external to the program module (e.g., of app 306). For example, the nexus data value can include a flag indicating whether the condition is external to the program module. If the condition is external to the program module, the next block can be block 1002. In this way, the program module can be retried or otherwise executed again in response to the determination. If not, the next block can be block 1010. The program module can be retried indefinitely or a selected number of times. In some examples, if the condition is external to the program module, execution of the program module can be terminated.

At block 1010, in some examples, the condition is not external to the program module. For example, the condition can be a software error leading to a bug. In some of these examples, the program module in app 306 or the program-execution module 248 can handle the bug. Bug handling can include, e.g., reporting an error to a user such as the entity 308, crashing, or terminating gracefully.

Figure 11:
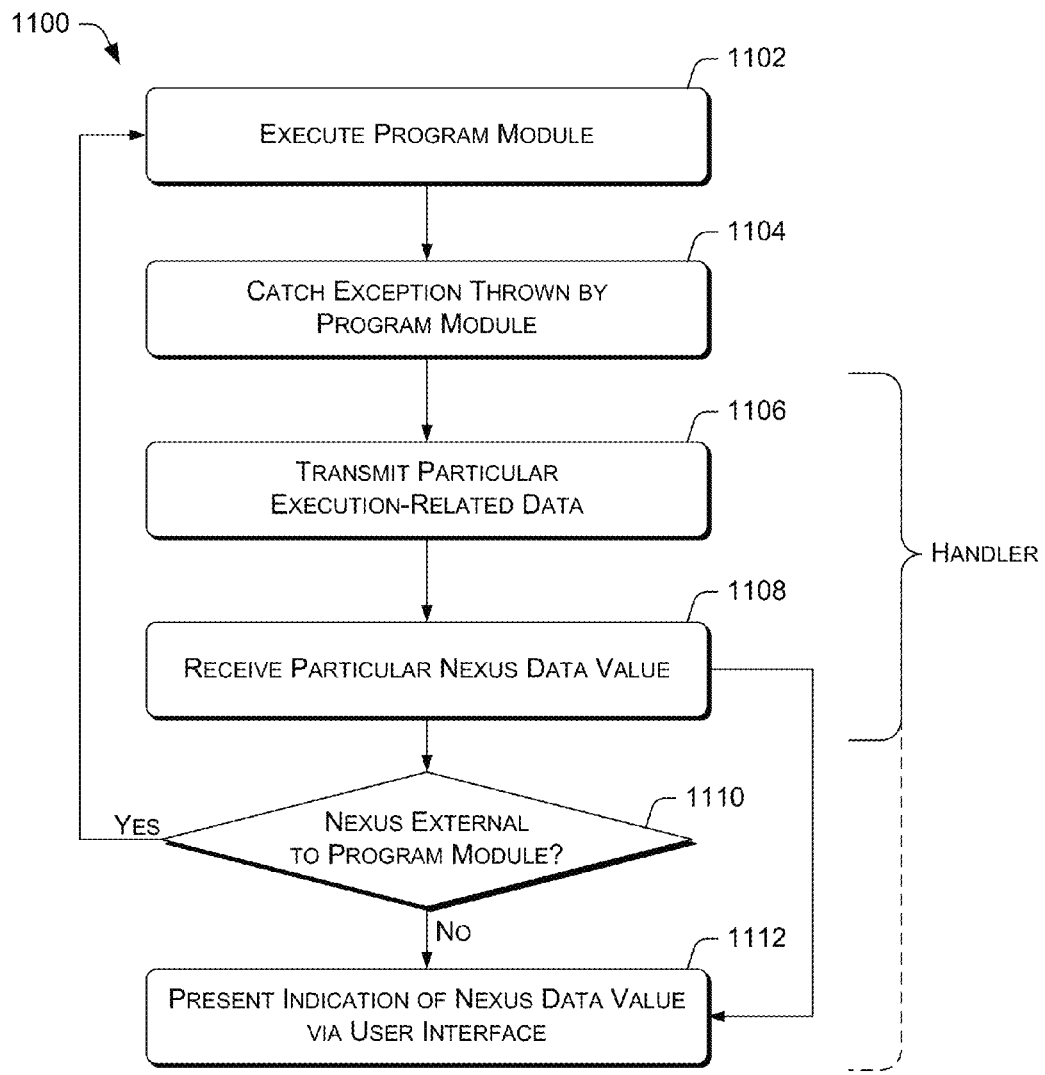
FIG. 11 is a flow diagram that illustrates example processes for responding to a bug, e.g., at an untethered device.

FIG. 11 is a flow diagram that illustrates an example process 1100 for responding to a bug.

At block 1102, in some examples, the program-execution module 248 can execute a program module, e.g., of the app 306.

At block 1104, in some examples, an exception handler or other error-trapping or -handling routine, e.g., in the app 306, can catch an exception thrown by the executed program module. In some examples, an exception handler corresponding to the exception catches the exception. Exceptions can be thrown, e.g., by language facilities such as those in C++ or PYTHON, or by operating-system facilities such as MICROSOFT WINDOWS's structured exception handling (SEH). In some examples, blocks 1106 and 1108 can be performed within the exception handler (graphically indicated by the solid brace). In some examples, at least some of block 1106, block 1108, decision block 1110, and block 1112 can be performed within the exception handler (graphically indicated by the dashed brace).

At block 1106, in some examples, the data-exchange module 250 can transmit execution-related data corresponding at least in part to the program module via the communications interface 232.

At block 1108, in some examples, the data-exchange module 250 can receive a nexus data value via the communications interface 232. Block 1108 can be followed by decision block 1110 or block 1112, e.g., according to the design of the app 306.

At decision block 1110, the program-execution module 248, one or more of the processing units 220, or another component or components of the computing device 200 can determine whether the nexus data value indicates a condition external to the program module. If so, the next block can be block 1002. In this way, the program module can be executed again in response to the determination. If not, the next block can be block 1112. In some examples, if the condition is external to the program module, execution of the program module can be terminated.

At block 1112, in some examples, the program-execution module 248, one or more of the processing units 220, or another component or components of the computing device 200 can present an indication of the nexus data value via the user interface 210. For example, a dialog box or toast notification including a human-readable representation of the nexus data value can be presented.

Illustrative Results

A machine-learning system as described herein was constructed using services provided by the MICROSOFT AZURE ML cloud service. The system was trained using execution-related data records from the Windows Phone Error Reporting (WPER) system, which stores execution-related data of bugs on smartphones running the WINDOWS PHONE operating system. The WPER data records included at least some of an application ID of the app experiencing the bug, the type of exception thrown, a stack trace of the app, the function or event handler in which the exception occurred, and device state information such as network connectivity and performance counters. The device state information can included amount of memory free and radio signal strength of a wireless network connection, where appropriate. nexus data for the execution-related data records were determined using data mining and human-guided analysis techniques.

The prototype machine-learning system was constructed using a one-versus-all two-class decision jungle classifier on more than one million execution-related data records in the training data 314. The prototype provided 99.19% accuracy on the training data set, as determined by k-fold cross-validation. A REST API was constructed to permit accessing the prototype from an untethered device.

EXAMPLE CLAUSES

A: An untethered computing device comprising a communications interface; one or more processing units operably coupled to the communications interface; and one or more computer storage media storing instructions that, when executed by the one or more processing units, cause the one or more processing units to perform operations comprising: transmitting particular execution-related data via the communications interface, e.g., in the absence of a bug, on a selected schedule, upon detection of an anomalous or unexpected condition that does not cause a bug.

B: The device as paragraph A recites, the operations further comprising receiving particular nexus data.

C: The device as paragraph A or B recites, the operations further comprising adjusting app operation based at least in part on the particular nexus data, e.g., by saving user work and terminating gracefully, by restarting, or by reporting the nexus data to the user.

D: The device as paragraph C recites, the operations further comprising automatically replacing at least one do-nothing code block with code to perform the transmitting, receiving, and adjusting.

E: An untethered computing device comprising a program module of an app, wherein the program module is configured to interact with an entity, e.g., a user, another program, or another device.

F: A system comprising: one or more computer-readable media having stored thereon a plurality of modules and a computational model mapping execution-related data to nexus data, wherein the execution-related data corresponds to a software program for execution on an untethered device. and one or more processing units operably coupled to at least one of the computer-readable media, the processing unit adapted to execute modules of the plurality of modules comprising: a feature module configured to determine one or more execution features based at least in part on particular execution-related data; and an analysis module configured to determine particular nexus data corresponding to the particular execution-related data based at least in part upon the stored computational model and the determined execution features.

G: A system as paragraph F recites, further comprising a communications module configured to receive the particular execution-related data via a communications interface and to transmit at least some of the determined particular nexus data via the communications interface.

H: A system as paragraph F or G recites, wherein the stored computational model includes a machine-learning model.

I: A system as any of paragraphs F-H recites, wherein the execution-related data includes at least data of external resource availability, system performance, or hardware characteristics.

J: A system as paragraph I recites, wherein the execution-related data further includes at least an execution environment of the software program or an execution record of the software program.

K: A system as any of paragraphs F-J recites, wherein the nexus data includes an indication of an insufficient-resource condition, an invalid-input condition, or a physical-limitation condition.

L: A system as any of paragraphs F-K recites, wherein the feature module is configured to determine at least one of the execution features by binning at least one data value included in the execution-related data.

M: A system as any of paragraphs F-L recites, wherein the feature module is configured to determine at least one of the execution features by thresholding at least one data value included in the execution-related data.

N: A system as any of paragraphs F-M recites, wherein the plurality of modules further includes a modeling module configured to determine the computational model based at least in part on execution features of a plurality of execution-related data records and respective nexus data values.

O: A system as any of paragraphs F-N recites, wherein the analysis module is configured to: determine tentative nexus data values for the execution features of the particular execution-related data using respective ones of a plurality of classification modules; and to provide, as the particular nexus data, a most-commonly-occurring one of the tentative nexus data values.

P. A system as any of paragraphs F-M recites, wherein the execution-related data includes data of at least a battery life of the untethered device, a radio signal strength of the untethered device, a processor usage level of the untethered device, a memory usage level of the untethered device, an operating-system performance indication of the untethered device, a device performance indication of the untethered device, a network performance indication of the untethered device, or an indication of a hardware type of the untethered device.

Q. A system as any of paragraphs F-P recites, wherein the execution-related data further includes data of at least an identifier of the software program, an identifier of another software program running on the untethered device concurrently with the software program, a stack trace of the software program, an indication of an exception thrown by the software program, an indication of a last function called by the software program, an indication of a function in the software program in which the exception was thrown, an indication of an event handler of the software program executing when the exception was thrown, an indication of an operating-system version of the untethered device, configuration data of the software program, configuration data of the untethered device, or one or more debug symbols of the software program.

R. A system as any of paragraphs F-Q recites, wherein the nexus data includes an indication of a memory depletion, a secondary-storage depletion, an input overrun, a proxy error, an invalid data input, an invalid sensor reading, a network connectivity failure, or a server response error.

S: A method, comprising: receiving an execution-related data record, the execution-related data record corresponding to a software program and an untethered device, and a corresponding nexus data value; determining one or more execution features of the execution-related data record; and determining, based at least in part on the execution features of the execution-related data record and the nexus data value, a computational model to determine a particular nexus data value for particular execution-related data.

T: A method as paragraph S recites, further comprising receiving the particular execution-related data from a particular untethered device, determining the particular nexus data value based at least in part on the determined computational model, and transmitting the determined particular nexus data value to the particular untethered device.

U: A method as paragraph S or T recites, wherein the determining the computational model includes determining respective significances of individual ones of the execution features and providing the computational model having as inputs individual ones of the execution features having at least a selected significance, or having a significance rank within a selected number of a highest-significance one of the execution features.

V: A method as any of paragraphs S-U recites, wherein the receiving includes receiving a plurality of execution-related data records including the execution-related data record, each of the plurality of execution-related data records corresponding to a software program and an untethered device, and a plurality of corresponding nexus data values including the nexus data value, wherein the determining the computational model includes using two or more different learning modules to classify the execution features of individual ones of the plurality of execution-related data records with respect to the corresponding ones of the plurality of nexus data values.

W: A method as paragraph V recites, further comprising: determining accuracy values of individual ones of the learning modules with respect to the execution features of individual ones of the plurality of execution-related data records and the corresponding ones of the plurality of nexus data values; and providing the computational model including one or more classification modules corresponding to respective ones of the learning modules having at least a selected accuracy value, or having an accuracy rank within a selected number of a highest-accuracy one of the learning modules.

X: A method as paragraph V or W recites, further comprising: determining output-specific accuracy values of individual output nexus data values of individual ones of the learning modules based at least in part on individual ones of the plurality of execution-related data records and the corresponding ones of the plurality of nexus data values; and providing the computational model configured to: determine one or more tentative nexus data values for the execution features of the particular execution-related data using classification modules corresponding to respective ones of the learning modules; and provide, as the particular nexus data value, one of the tentative nexus data values having at least a selected output-specific accuracy value for the corresponding tentative nexus data value and learning module or having a highest-ranked output-specific accuracy value for the corresponding tentative nexus data value and learning module.

Y: A method as any of paragraphs S-X recites, wherein the receiving includes receiving a plurality of execution-related data records including the execution-related data record, each of the plurality of execution-related data records corresponding to a software program and an untethered device, and a plurality of corresponding nexus data values including the nexus data value, wherein the determining the computational model includes using a learning module to classify the execution features of individual ones of the plurality of execution-related data records with respect to the corresponding ones of the plurality of nexus data values.

Z: An untethered computing device comprising: a communications interface; one or more computer storage media having therein a plurality of modules; and a processing unit operably coupled to the communications interface and configured to execute modules of the plurality of modules comprising: a program module of an app; a program-execution module configured to execute the program module; and a data-exchange module configured to transmit execution-related data corresponding at least in part to the program module via the communications interface and to receive a nexus data value via the communications interface; wherein the program-execution module is further configured to execute the program module again in response to the nexus data value indicating a condition external to the program module.

AA: An untethered computing device as paragraph Z recites, wherein the program-execution module is further configured to catch an exception thrown by the executed program module, wherein the data-exchange module is configured to transmit the execution-related data and receive the nexus data value within an exception handler corresponding to the caught exception.

AB: An untethered computing device as paragraph Z or AA recites, further comprising a user interface operably coupled to the one or more processing units, wherein the program-execution module is further configured to present an indication of the nexus data value via the user interface.

AC: An untethered computing device as any of paragraphs Z-AB recites, further comprising a sensor operably coupled to the one or more processing units and configured to output sensor data corresponding to at least one physical property, wherein the program module is configured to attempt to read particular sensor data from the sensor.

AD: A computer-readable medium, e.g., a computer storage medium, having thereon computer-executable instructions, the computer-executable instructions upon execution configuring a computer to perform operations as any of paragraphs S-Y recites.

AE: A device comprising: a processor; and a computer-readable medium, e.g., a computer storage medium, having thereon computer-executable instructions, the computer-executable instructions upon execution by the processor configuring the device to perform operations as any of paragraphs S-Y describe.

AF: A system comprising: means for processing; and means for storing having thereon computer-executable instructions, the computer-executable instructions including means to configure the device to carry out a method as any of paragraphs S-Y describe.

AG: A system, comprising: means for receiving an execution-related data record, the execution-related data record corresponding to a software program and an untethered device, and a corresponding nexus data value; means for determining one or more execution features of the execution-related data record; and means for determining, based at least in part on the execution features of the execution-related data record and the nexus data value, a computational model to determine a particular nexus data value for particular execution-related data.

AH: A system as paragraph AG recites, further comprising means for receiving the particular execution-related data from a particular untethered device, means for determining the particular nexus data value based at least in part on the determined computational model, and means for transmitting the determined particular nexus data value to the particular untethered device.

AI: A system as paragraph AG or AH recites, wherein the means for determining the computational model includes means for determining respective significances of individual ones of the execution features and means for providing the computational model having as inputs individual ones of the execution features having at least a selected significance, or having a significance rank within a selected number of a highest-significance one of the execution features.

AJ: A system as any of paragraphs AG-AI recites, wherein the means for receiving includes means for receiving a plurality of execution-related data records including the execution-related data record, each of the plurality of execution-related data records corresponding to a software program and an untethered device, and a plurality of corresponding nexus data values including the nexus data value, wherein the means for determining the computational model includes means for using two or more different learning modules to classify the execution features of individual ones of the plurality of execution-related data records with respect to the corresponding ones of the plurality of nexus data values.

AK: A system as paragraph AJ recites, further comprising: means for determining accuracy values of individual ones of the learning modules with respect to the execution features of individual ones of the plurality of execution-related data records and the corresponding ones of the plurality of nexus data values; and means for providing the computational model including one or more classification modules corresponding to respective ones of the learning modules having at least a selected accuracy value, or having an accuracy rank within a selected number of a highest-accuracy one of the learning modules.

AL: A system as paragraph AJ or AK recites, further comprising: means for determining output-specific accuracy values of individual output nexus data values of individual ones of the learning modules based at least in part on individual ones of the plurality of execution-related data records and the corresponding ones of the plurality of nexus data values; and means for providing the computational model configured to: determine one or more tentative nexus data values for the execution features of the particular execution-related data using classification modules corresponding to respective ones of the learning modules; and provide, as the particular nexus data value, one of the tentative nexus data values having at least a selected output-specific accuracy value for the corresponding tentative nexus data value and learning module or having a highest-ranked output-specific accuracy value for the corresponding tentative nexus data value and learning module.

AM: A system as any of paragraphs AG-AL recites, wherein the means for receiving includes means for receiving a plurality of execution-related data records including the execution-related data record, each of the plurality of execution-related data records corresponding to a software program and an untethered device, and a plurality of corresponding nexus data values including the nexus data value, wherein the means for determining the computational model includes a learning module configured to classify the execution features of individual ones of the plurality of execution-related data records with respect to the corresponding ones of the plurality of nexus data values.

CONCLUSION

The nexus determination techniques described herein can reduce the amount of time required to locate software faults, and can permit automated retrying of faults not attributable to the app experiencing the fault. This can provide an increase in user and developer satisfaction and software robustness.

Although the techniques have been described in language particular to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing devices 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

The disclosure includes combinations of the examples described herein. References to a particular "example" and the like refer to features that are present in at least one example or configuration of what is within the scope of the disclosed subject matter. Separate references to "an example" or "particular examples" or the like do not necessarily refer to the same example or examples; however, such examples are not mutually exclusive, unless specifically indicated. The use of singular or plural in referring to "example," "examples," "method," "methods" and the like is not limiting.

Any routine descriptions, elements or blocks in the flow diagrams described herein and/or depicted in the attached figures should be understood as potentially representing modules, segments, or portions of code that include one or more executable instructions for implementing particular logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:
1. A system comprising:
one or more computer-readable media having stored thereon computer-executable instructions; and
one or more processing units operably coupled to at least one of the computer-readable media, the one or more processing units adapted to execute the computer-executable instructions to cause the system to:

receive, from a first untethered device, execution-related data corresponding to a first crash report associated with a first software program executed on the first untethered device and a respective nexus data value;

determine one or more execution features based at least in part on the execution-related data;

receive, from a second untethered device, particular execution-related data corresponding to at least a portion of a second crash report associated with a second software program executed on the second untethered device;

determine a particular nexus data value for the particular execution-related data using a computational model, wherein the particular nexus data value indicates that a condition is one of external and not external to a program module; and in response to determining that the particular nexus value indicates that the condition is external to the program module, transmit the particular nexus data value to the second untethered device to cause the second untethered device to re-execute the second software program.

2. The system as claim 1 recites, further comprising the first untethered device.

3. The system as claim 1 recites, wherein the stored computational model includes a machine-learning model.

4. The system as claim 1 recites, wherein the execution-related data includes at least one of external resource availability, system performance, or hardware characteristics.

5. The system as claim 4 recites, wherein the execution-related data further includes at least one of an execution environment of the software program or an execution record of the first software program.

6. The system as claim 1 recites, wherein the nexus data value includes at least one of an indication of an insufficient-resource condition, an invalid-input condition, or a physical-limitation condition.

7. The system as claim 1 recites, wherein the computer-executable instructions further cause the system to determine at least one of the one or more execution features by binning at least one data value included in the execution-related data.

8. The system as claim 1 recites, wherein the computer-executable instructions further cause the system to determine at least one of the one or more execution features by thresholding at least one data value included in the execution-related data.

9. The system as claim 1 recites, wherein the computer-executable instructions further cause the system to determine the computational model based at least in part on execution features of a plurality of execution-related data records and respective nexus data values.

10. The system as claim 1 recites, wherein the computer-executable instructions further cause the system to:

determine tentative nexus data values for the one or more execution features using respective ones of a plurality of classification modules; and provide, as the particular nexus data value, a most-commonly-occurring one of the tentative nexus data values.

11. A method, comprising:

receiving an execution-related data record and a corresponding nexus data value from a first untethered device, the execution-related data record corresponding to a first crash report of a first software program executing on the first untethered device;

determining one or more execution features of the execution-related data record;

receiving particular execution-related data corresponding to at least a portion of a second crash report associated with a second software program executed on a second untethered device;

determining, based at least in part on the one or more execution features of the execution-related data record and the corresponding nexus data value, a machine-learning model to determine a particular nexus data value for the particular execution-related data;

determining the particular nexus data value based at least in part on the particular execution-related data using the machine-learning model, wherein the particular nexus data value indicates that a condition is one of external and not external to a program module; and in response to determining that the particular nexus data value indicates that the condition is not external to the program module, transmitting the particular nexus data value to the second untethered device to cause the second untethered device to debug the second software program.

12. The method as claim 11 recites, wherein the determining the machine-learning model includes:

determining respective significances of individual ones of the one or more execution features; and providing the machine-learning model having as inputs individual ones of the one or more execution features having at least a selected significance, or having a significance rank within a selected number of a highest-significance one of the one or more execution features.

13. The method as claim 11 recites, further comprising:

receiving a plurality of execution-related data records including the execution-related data record, each of the plurality of execution-related data records corresponding to a crash of a software program and to an untethered device;

receiving a plurality of corresponding nexus data values; and determining the machine-learning model using two or more different learning modules to classify respective execution features of individual ones of the plurality of execution-related data records with respect to the corresponding ones of the plurality of nexus data values.

14. The method as claim 13 recites, further comprising:

determining accuracy values of individual ones of the learning modules with respect to respective execution features of the individual ones of the plurality of execution-related data records and the corresponding ones of the plurality of nexus data values; and providing the machine-learning model including one or more classification modules corresponding to respective ones of the learning modules having at least a selected accuracy value, or having an accuracy rank within a selected number of a highest-accuracy one of the learning modules.

15. The method as claim 13 recites, further comprising:

determining output-specific accuracy values of individual output nexus data values of individual ones of the learning modules based at least in part on individual ones of the plurality of execution-related data records and the corresponding ones of the plurality of nexus data values; and providing the machine-learning model configured to:

determine one or more tentative nexus data values for execution features of the particular execution-related data using classification modules corresponding to respective ones of the learning modules; and provide, as the particular nexus data value, one of the tentative nexus data values that has one of:

at least a selected output-specific accuracy value for the corresponding tentative nexus data value and learning module; or a highest-ranked output-specific accuracy value for the corresponding tentative nexus data value and learning module.

16. A first computing system comprising:

a program module; and at least one memory storing computer-executable instructions that when executed by the program module cause the system to:

receive an execution-related data record corresponding to a first crash report of a first software program;

transmit the execution-related data record and a corresponding nexus data value to a second computing system;

determine one or more execution features of the execution-related data record;

receive particular execution-related data corresponding to at least a portion of a second crash report associated with a second software program executed on the second computing system;

identify, based at least in part on the one or more execution features of the execution-related data record and the respective nexus data value, a machine-learning model;

determine a particular nexus data value based at least in part on the particular execution-related data using the machine-learning model, wherein the particular nexus data value indicates that a condition is one of external and not external to the program module; and in response to determining that the particular nexus data value indicates that the condition is external to the program module, transmit the particular nexus data value to the second computing system to cause the second computing system to re-execute the second software program.

17. The first computing system of claim 16, wherein the execution-related data includes at least one of external resource availability, system performance, or hardware characteristics.

18. The first computing system of claim 16, wherein the execution-related data further includes at least one of an execution environment of the software program or an execution record of the first software program.

19. The first computing system of claim 16, wherein the nexus data value includes at least one of an indication of an insufficient-resource condition, an invalid-input condition, or a physical-limitation condition.

20. The first computing system of claim 16, wherein the computer-executable instructions further cause the system to determine at least one of the one or more execution features by binning at least one data value included in the execution-related data.

* * * * *